United States Patent
Nap et al.

(10) Patent No.: US 6,246,677 B1
(45) Date of Patent: Jun. 12, 2001

(54) AUTOMATIC METER READING DATA COMMUNICATION SYSTEM

(75) Inventors: Kimbel A. Nap, Glendale; Lance A. Ehrke, Brookfield; Donn R. Dresselhuys, Shorewood, all of WI (US)

(73) Assignee: Innovatec Communications, LLC, Butler, WI (US)

( * ) Notice: Subject to any disclaimer, the term of this patent is extended or adjusted under 35 U.S.C. 154(b) by 0 days.

(21) Appl. No.: 09/242,793
(22) PCT Filed: Sep. 4, 1997
(86) PCT No.: PCT/US97/15570
§ 371 Date: Feb. 23, 1999
§ 102(e) Date: Feb. 23, 1999
(87) PCT Pub. No.: WO98/10394
PCT Pub. Date: Mar. 12, 1998

Related U.S. Application Data

(60) Provisional application No. 60/024,698, filed on Sep. 6, 1996.

(51) Int. Cl.[7] ......................................................... H04J 3/16
(52) U.S. Cl. ................ 370/346; 340/870.02; 379/106.03
(58) Field of Search ..................................... 370/338, 342, 370/335, 328, 441, 346, 449; 340/870.02, 870.03, 870.04, 870.11, 870.06; 375/130; 379/106.03

(56) References Cited

U.S. PATENT DOCUMENTS

| | | | |
|---|---|---|---|
| 5,432,507 | * | 7/1995 | Mussino et al. ................ 340/870.03 |
| 5,553,094 | * | 9/1996 | Lohnson et al. ..................... 375/200 |
| 5,719,564 | * | 2/1998 | Sears ............................... 340/870.02 |

* cited by examiner

Primary Examiner—Ajit Patel
(74) Attorney, Agent, or Firm—Andrus, Sceales, Starke & Sawall, LLP

(57) ABSTRACT

An automatic meter reading data communication system having an integrated digital encoder and two-way wireless transceiver that is attachable to a wide variety of utility meters for meter data collection and information management. The integrated encoder and transceiver communicates commodity usage information over a two-way 900 MHz spread spectrum local area network (LAN) to a remotely located communication node. The communication node transmits this data to a utility service provider over a commercially available fixed wide area network (WAN). The utility service provider may also request data from the communication node over the same fixed wide area network.

18 Claims, 16 Drawing Sheets

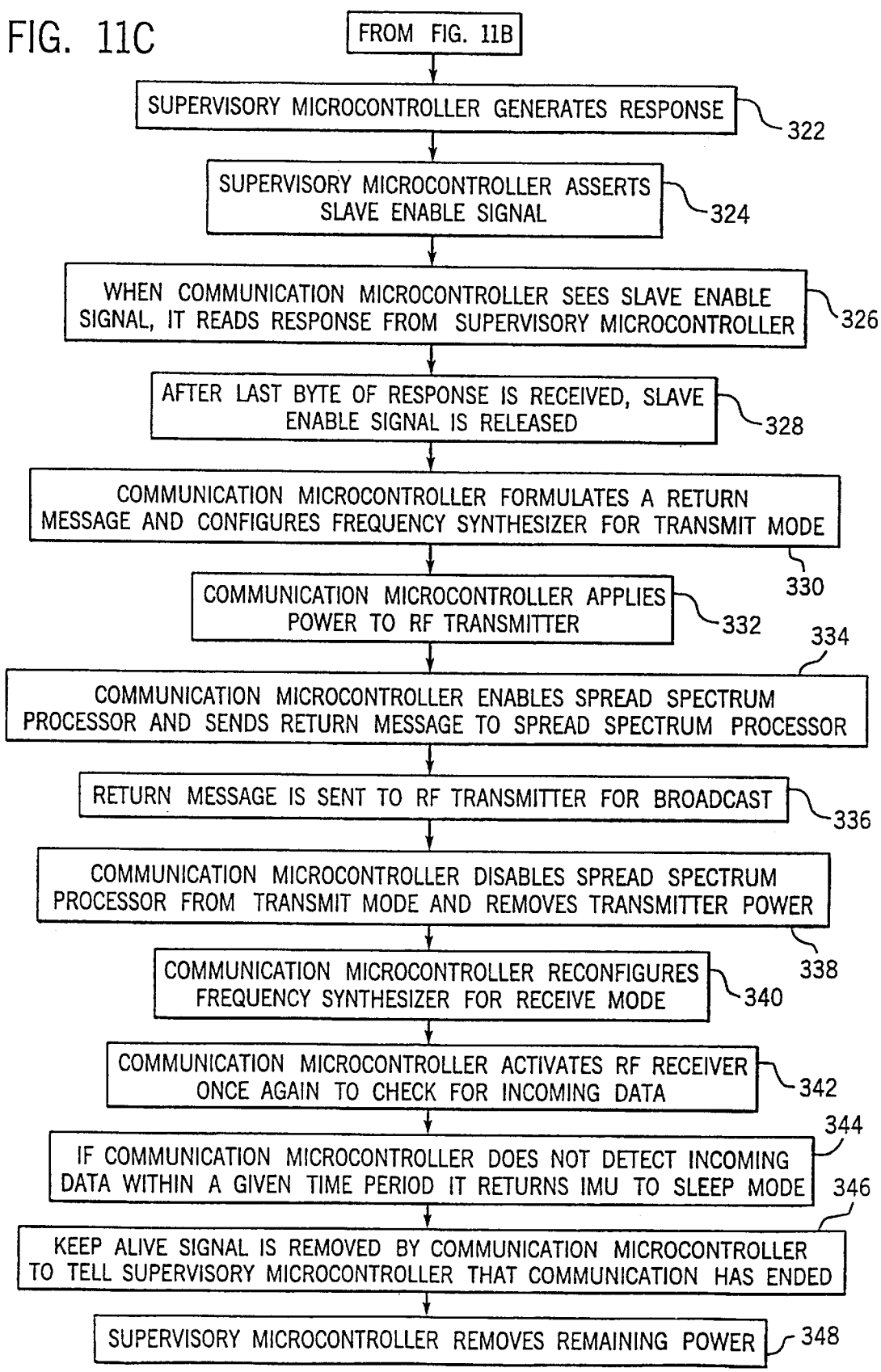

AUTOMATIC METER READING DATA COMMUNICATION SYSTEM

CROSS REFERENCE TO RELATED APPLICATION

This application is based on provisional U.S. application Ser. No. 60/024,698 filed on Sep. 6, 1996.

BACKGROUND OF THE INVENTION

The present invention relates to automatic meter reading data communication systems. More specifically, the invention relates to an integrated device that attaches to utility meters and communicates commodity usage data and other information over a two-way wireless local area network (LAN) to a remotely located communication device that transmits the data over a two-way fixed common carrier wide area network (WAN) to a utility service provider.

Commodity usage is conventionally determined by utility companies using meters that monitor subscriber consumption. The utility service provider typically determines the subscriber's consumption by sending a service person to each meter location to manually record the information displayed on the meter dial. The manual reading is then entered into a computer which processes the information and outputs a billing statement for the subscriber. Often times it is very difficult for the service person to access a meter. When access to a meter is not possible, billings are made on the basis of estimated readings. These estimated billings often lead to customer complaints.

Visual on-site meter reading by utility service personnel is highly labor intensive, inefficient and very expensive. Therefore, there has been a strong interest on the part of utility companies to take advantage of modern technology to reduce operating costs and increase efficiency by eliminating the necessity for visual on-site meter readings.

Many attempts have been made in recent years to develop an automatic meter reading system for water, gas and electric meters which avoid the high costs of visual on-site meter reading. However, most of these prior art systems have achieved little success.

Various types of devices have been attached to utility meters in an effort to simplify meter reading. These devices were developed to transfer commodity usage data over a communication link to a centrally located service center or utility. These communication links included telephone lines, power lines, or a radio frequency (RF) link.

The use of existing telephone lines and power lines to communicate commodity usage data to a utility have encountered significant technical difficulties. In a telephone line system, the meter data may interfere with the subscriber's normal phone line operation, and would require cooperation between the telephone company and the utility company for shared use of the telephone lines. A telephone line communication link would also require a hard wire connection between the meter and the main telephone line, increasing installation costs. The use of a power line carrier (PLC) communication link over existing power lines would again require a hard wire connection between the meter and the main power line. Another disadvantage of the PLC system is the possibility of losing data from interference on the power line.

Meters have been developed which can be read remotely. Such meters are configured as transponders and include a radio transmitter for transmitting data to the utility. These prior art systems required the meter to be polled on a regular basis by a data interrogator. The data interrogator may be mounted to a mobile unit traveling around the neighborhood, incorporated within a portable hand-held unit carried by a service person, or mounted at a centrally located site. When the meter is interrogated by an RF signal from the data interrogator, the meter responds by transmitting a signal encoded with the meter reading and any other information requested. The meter does not initiate the communication.

However, such prior art systems have disadvantages. The first disadvantage is that the device mounted to the meter generally has a small transceiver having a very low power output and thus a very short range. This would require that the interrogation unit be in close proximity to the meters. Another disadvantage is that the device attached to the meter must be polled on a regular basis by the data interrogator. The device attached to the meter is not able to initiate a communication. The mobile and hand-held data interrogators are of limited value since it is still necessary for utility service personnel to travel around neighborhoods and businesses to remotely read the meters. It only avoids the necessity of entering a residence or other building to read the meters. The systems utilizing a data interrogator at fixed locations still have the disadvantages of low power output from the devices attached to the meters, and requiring polling by the data interrogator to initiate communication.

Therefore, although automatic meter reading systems are known in the prior art, the currently available automatic meter reading systems suffer from several disadvantages, such as low operating range and communication reliability. Thus, it would be particularly desirable to provide an automatic meter reading system that provides reliable communication of information from the meter to the utility, thus avoiding the necessity for utility service personnel to manually read the meters.

SUMMARY OF THE INVENTION

An object of the present invention is to provide a reliable automatic meter reading data communication system extending from a commodity meter to the utility service provider.

Another object of the present invention is to provide an interface management unit that attaches to existing commodity meter register heads and provides commodity utilization data to a remotely located gateway node over a two-way wireless spread spectrum local area network.

A further object of the invention is to provide a gateway node for receiving commodity utilization data from the interface management unit and transmitting that data to a utility service provider over a commercially available fixed common carrier wide area network.

Yet another object of the invention is to provide the communication links necessary for performing data requests from the utility, preprogrammed scheduled meter readings and handling spontaneous tamper and alarm messages from an interface management unit attached to a commodity meter.

The present invention is an automatic meter reading data communication system which incorporates an interface management unit that is attachable to commodity meters such as water, gas and electric meters for collecting, processing and transmitting data from the meter to a remotely located gateway node which transmits the data to the utility service provider. The interface management unit replaces the register head of the commodity meter using an adapter ring to retrofit the interface management unit onto the existing meter body for meters produced by a wide variety of manufacturers. The interface management unit comprises a digital encoder and two-way wireless transceiver for automatically reading commodity usage based on requests from the utility or preprogrammed scheduled readings. The interface management unit also monitors the status of the meters to determine tamper and alarm conditions.

The encoder and transceiver of the interface management unit are made up of four major components. These components include a supervisory microcontroller, a communication microcontroller, a spread spectrum processor and an RF transceiver. The supervisory microcontroller monitors and obtains commodity utilization data from the meter. The supervisory microcontroller also senses for the presence of an interrogation signal from the gateway node. The communication microcontroller is connected to the supervisory microcontroller and controls the internal and external communication functions of the interface management unit. The spread spectrum processor is coupled to the communication microcontroller for enabling the interface management unit to transmit and receive data utilizing an RF spread spectrum communication technique over the local area network. The RF transceiver is coupled to the spread spectrum processor and the communication microcontroller for transmitting commodity utilization data from the meter and for receiving interrogation signals from the gateway node.

The gateway node is located remotely from the interface management unit to complete the local area network. The gateway node is also made up of four major components. These components include a wide area network interface module, an initialization microcontroller, a spread spectrum processor and an RF transceiver. The gateway node is responsible for providing interrogation signals to the interface management unit and for receiving commodity utilization data from the interface management unit for the local area network. However, the gateway node also provides the link to the utility service provider over a commercially available fixed two-way common carrier wide area network.

The RF transceiver of the gateway node transmits interrogation signals from the utility or preprogrammed signals for scheduled readings to the interface management unit, and receives commodity utilization data in return from the interface management unit for transmission to the utility over the wide area network. The spread spectrum processor is coupled to the RF transceiver and enables the gateway node to transmit and receive data utilizing the spread spectrum communication technique. The WAN interface module is coupled to the spread spectrum processor and transmits data to and from the utility service provider over any commercially available wide area network that is desired. A different WAN interface module can be used for each different commercially available wide area network desired. The initialization microcontroller is interposed between the interface module and the spread spectrum processor for controlling operation of the spread spectrum processor and for controlling communication within the gateway node.

In an alternate embodiment of the invention, a relay node is located between the interface management unit and the gateway node within the local area network to provide added communication power when needed. Thus, when a gateway node is located outside the RF communication range of the interface management unit, a relay node is required to retransmit RF communication data to and from the interface management unit.

Meter reading, meter information management and network communications are all controlled by two-way system software that is preprogrammed into the interface management unit during manufacture and installation, and preprogrammed in the gateway node. The software allows the interface management unit to be configured to encode and manage input from a wide variety of water, gas and electric meters. The software enables an operator to easily change a serial number, provide a meter reading automatically or on demand, vary the units of measure being reported, and monitor system status for reporting tamper, alarm or low battery conditions.

BRIEF DESCRIPTION OF THE SEVERAL VIEWS OF THE DRAWINGS

FIG. 11C is a continuation of the flow diagram of FIG. 11B;

DETAILED DESCRIPTION OF THE INVENTION

The System

Figure 6A:
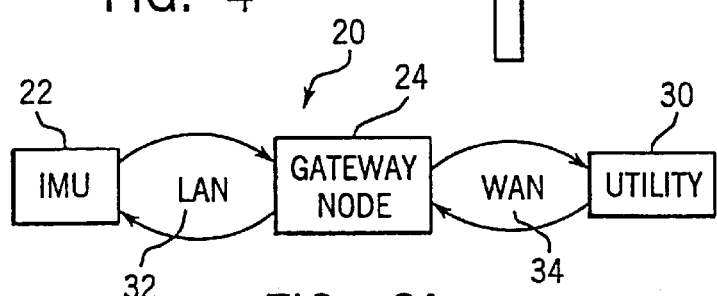
FIG. 6A is a flow diagram of an automatic meter reading data communication system.
Figure 6B:
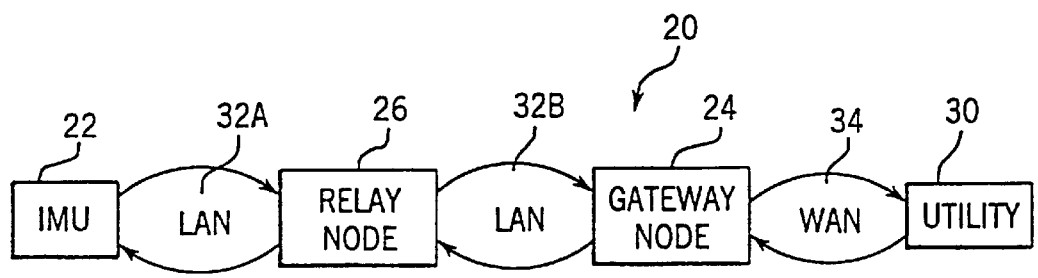
FIG. 6B is a flow diagram of an alternative automatic meter reading data communication system.
Figure 5A:
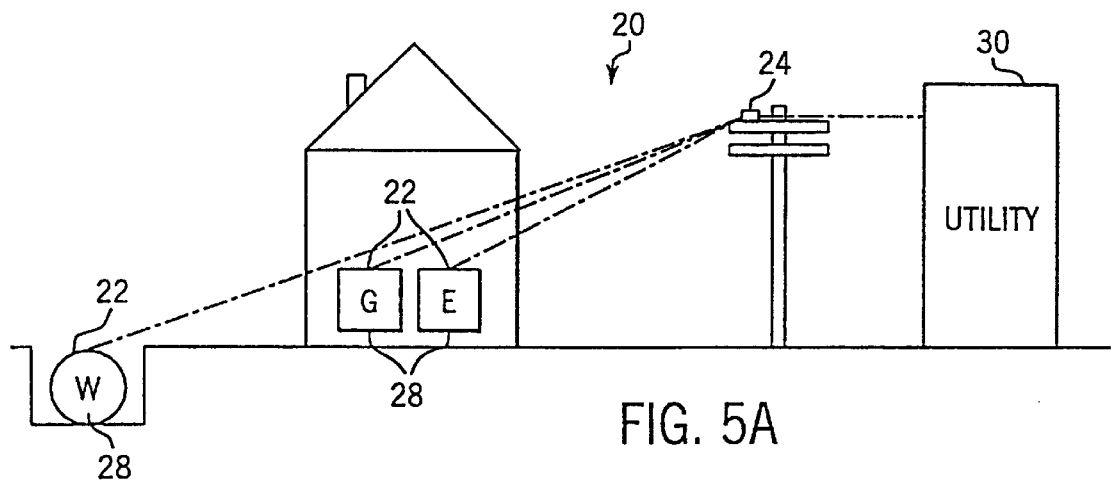
FIG. 5A is a schematic view of interface management units for water, gas and electric meters interfacing with a remote gateway node and the utility service provider.
Figure 5B:
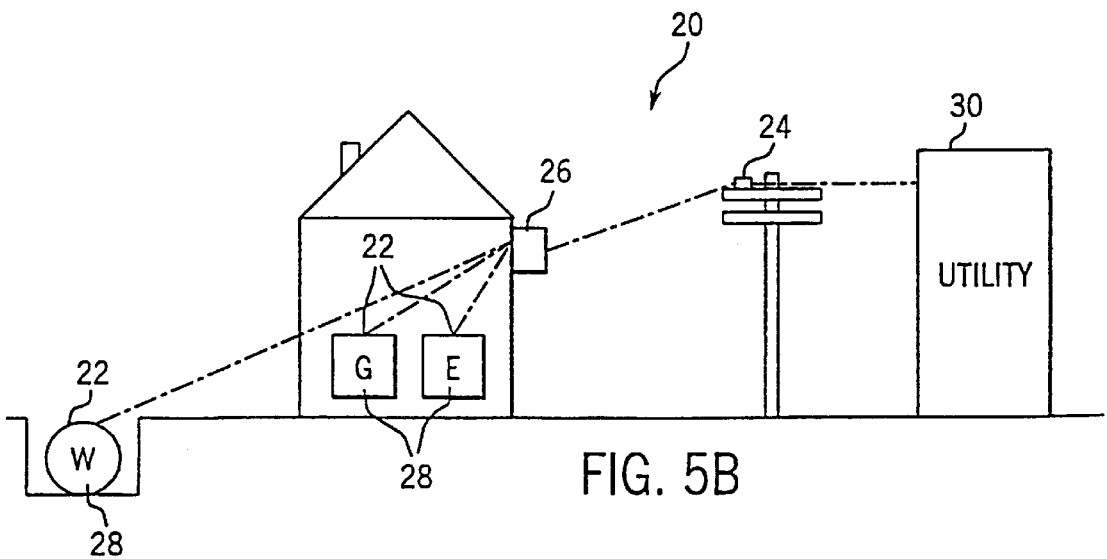
FIG. 5B is a schematic view of interface management units for water, gas and electric meters interfacing with a proximate relay node, a remote gateway node and the utility service provider.

As shown in FIGS. 5 and 6, the present invention provides an automatic meter reading data communication system 20 having an interface management unit 22 which communicates with a gateway node 24 located remote from the interface management unit 22. Located in between the interface management unit 22 and the gateway node 24 may be a relay node 26, FIGS. 5B and 6B, that is located proximate to the interface management units 22 and provides additional communication power from the interface management unit 22 to the gateway node 24. The communication range of the interface management unit 22 is approximately 400 ft. Therefore, if a gateway node 24 is farther than 400 ft. away from an interface management unit 22 then a relay node 26 is needed to retransmit the message from the interface management unit 22 to the gateway node 24. The RF communication ranges of the relay node 26 and the gateway node 24 are approximately one mile.

The interface management unit 22 is primarily a data gathering device that may be attached to a residential utility meter 28 such as a water or gas meter, for transmitting gathered data relating to consumed amounts of commodities, such as water or gas usage, to the gateway node 24. The interface management unit 22 may also interface with other devices to monitor such things as home security, environmental conditions, personal medical conditions, the existence of smoke or carbon monoxide, etc.

The gateway node 24 interrogates interface management unit 22 to obtain the gathered data by a radio frequency (RF) communication link and then transmits that data to a utility service provider 30 over a fixed wide area network (WAN) 34.

In a preferred embodiment of the invention, FIGS. 5A and 6A, a plurality of interface management units 22 attached to meters 28 for different commodities, such as water, gas and electric, communicate over a local area network (LAN) 32 to a gateway node 24 which transmits the commodity data from interface management units 22 to a utility 30 over a fixed common carrier wide area network (WAN) 34. The gateway node 24 provides end to end communications from the meter 28 to the utility 30. A first link in the data communication system is a two-way 900 MHz spread spectrum LAN 32. The second link within the data communication system is designed to be any commercially available two-way common carrier WAN 34. In this embodiment, a gateway node 24 must be within the communication range of the interface management unit 22 which is approximately 400 ft. However, if the gateway node 24 is outside of the interface management unit's communication range then a relay node 26 may be provided to retransmit the data from the interface management unit 22 to the gateway node 24 as shown in FIGS. 5B and is 6B. The operating range of the relay node is approximately one mile. The relay node 26 utilizes the same RF transceiver circuitry as the interface management unit 22 and the gateway node 24. The LAN communication links 32A and 32B shown in FIG. 6B technically comprise the same link as LAN 32 shown in FIG. 6A. The only difference is that the gateway node 24 in FIG. 6B is outside the communication range of interface management unit 22 thus requiring a retransmission of the data by relay node 26.

The data gathered from interface management units 22 is typically provided to computers in the utility company and used to generate billings or commodity usage data.

Interface Management Unit

Figure 1:
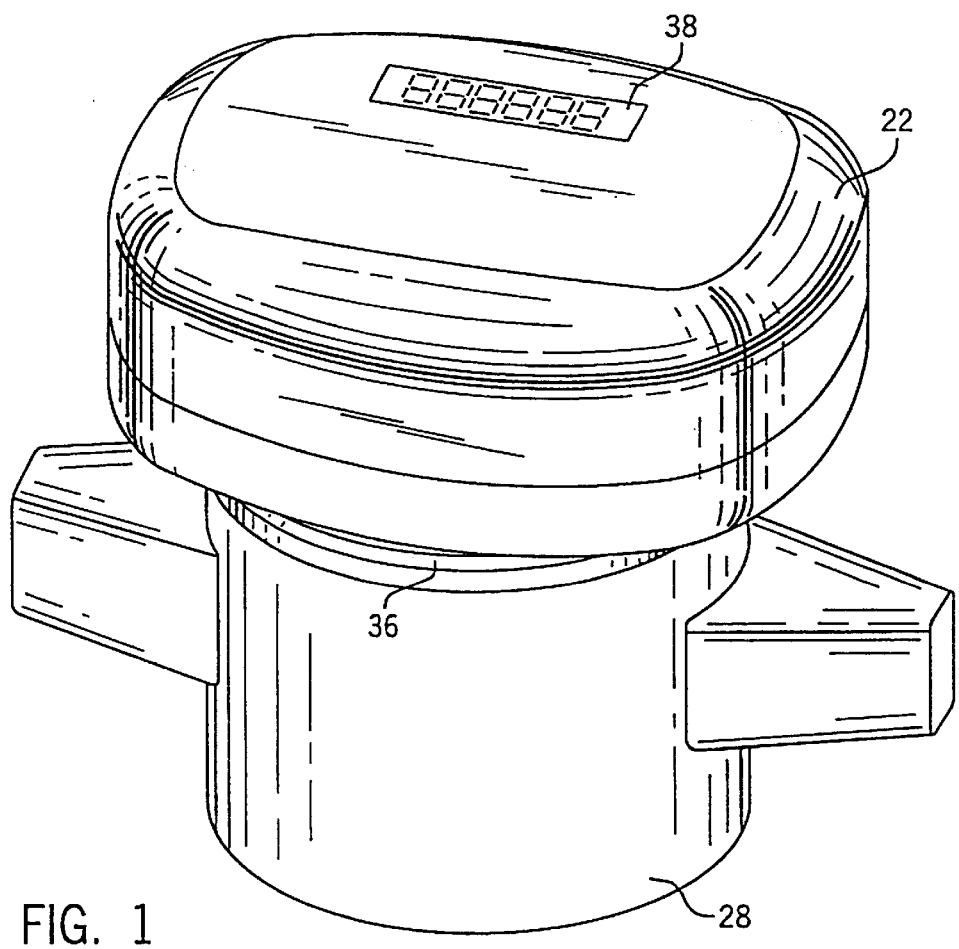
FIG. 1 is a perspective view of an interface management unit attached to a water meter in accordance with the present invention.
Figure 2:
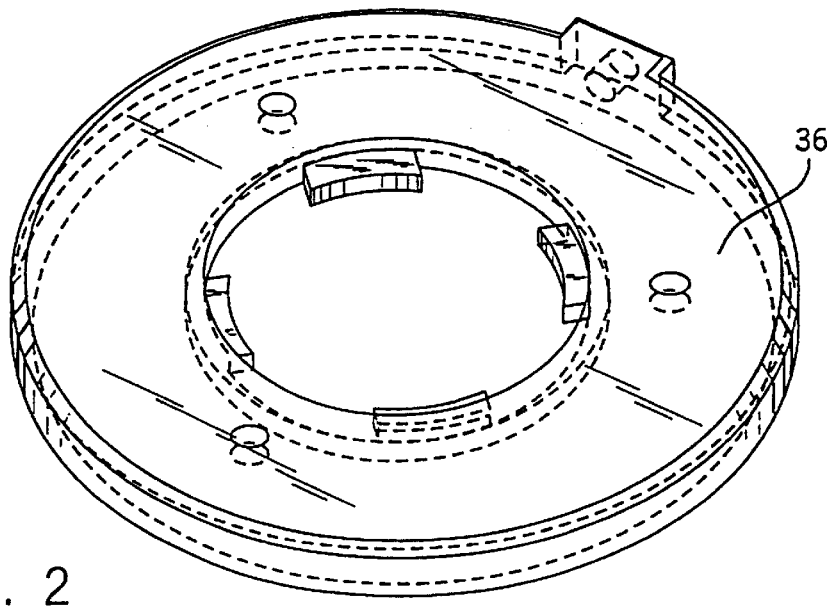
FIG. 2 is a perspective view of an adapter ring used to attach the interface management unit to the meter.

Referring now to FIG. 1, interface management unit 22 is an integrated unit that attaches to a water, gas or electric utility meter 28 by adapter ring 36. The interface management unit 22 replaces the register head of the meter 28 using the adapter ring 36 to retrofit the interface management unit 22 onto the existing meter body 28 for the meters of a wide variety of manufacturers. This is accomplished by the use of a plurality of different adapter rings 36 and programmable software within the interface management unit 22.

Figure 3:
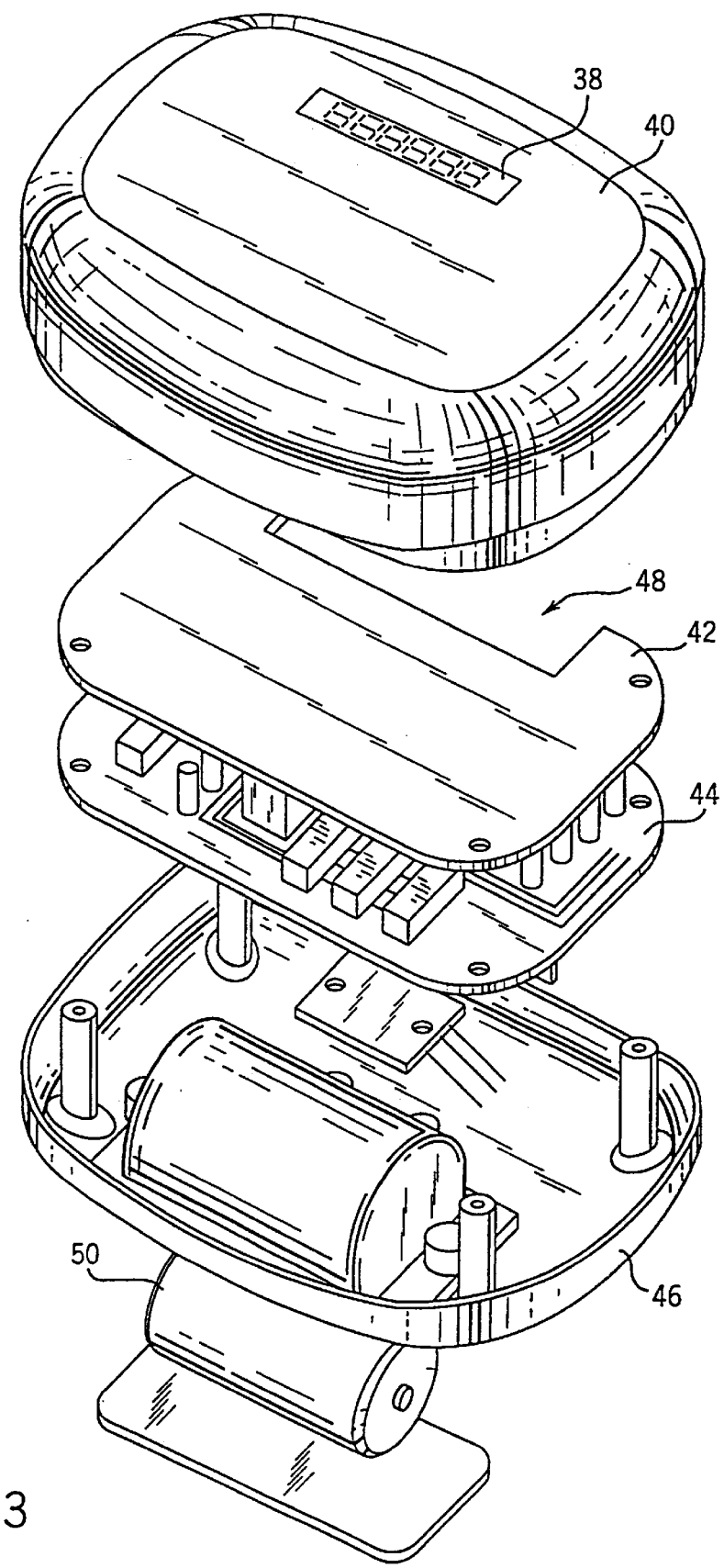
FIG. 3 is an exploded perspective view of the internal structure of an interface management unit.

FIG. 3 shows the internal structure of interface management unit 22. Interface management unit 22 comprises top cover 40, bottom cover 46, and two printed circuit boards 42 and 44. Printed circuit board 42 is preferably an RF antenna with a cut out 48 for the liquid crystal display 38 on printed circuit board 44. The liquid crystal display 38 displays meter reading, unit of measure, tamper and status conditions. Printed circuit board 44 includes various components and connectors as detailed in the block diagram of FIG. 7. Interface management unit 22 is powered by a battery 50. The compact integrated design and adaptability with various meters and meter brands presents a cost savings from prior art systems.

The interface management unit 22 is an integrated, digital encoder and two-way wireless transceiver that monitors the activity of a utility meter 28, such as a water, gas or electric meter, ascertaining commodity usage by counting pulses produced by a rotating vane in the meter, and communicates commodity usage data, via a RF local area network (LAN) to a relay node 26 or a gateway node 24. The events counted by interface management unit 22 are usually pulses generated by a turbine or other transducer element responsive to commodity flow through the meter. Additional features, such as valve actuation outputs and tamper inputs, may also be provided in interface management unit 22.

As hereinafter described in detail, communication between the interface management unit 22 and the relay node 26 or gateway node 24 is preferably established using a two-way 900 MHz direct sequence, spread spectrum data transmission technique having a plurality of channels in the employed frequency band. The interface management unit 22 performs its automatic meter reading functions in response to requests from the utility, from preprogrammed scheduled readings, or from spontaneous alarm messages. These automatic meter reading functions include monthly usage readings, remote first and final meter readings, real-time tamper detection and notification, virtual shut-off function, and alarm system functions. In addition, the interface management unit 22 attached to a water meter is capable of leak detection and low flow reporting, and is submersible in pit applications without a fixed antenna attachment. An interface management unit 22 attached to a gas meter is capable of runaway meter detection. The interface management unit 22 also performs security and information management tasks.

The interface management unit 22 is installed using a portable computer to program utility identification numbers, meter settings and readings, units of measure, and alarm set points. Once the interface management unit is installed, it is linked to a gateway node over two-way wireless LAN 32. As mentioned above, the interface management unit 22 does not need to be awakened in order to send data. The interface management unit can either initiate a communication on its own, perform previously programmed scheduled readings or respond to requests from the utility through the gateway node 24.

Communication Nodes

Figure 4:
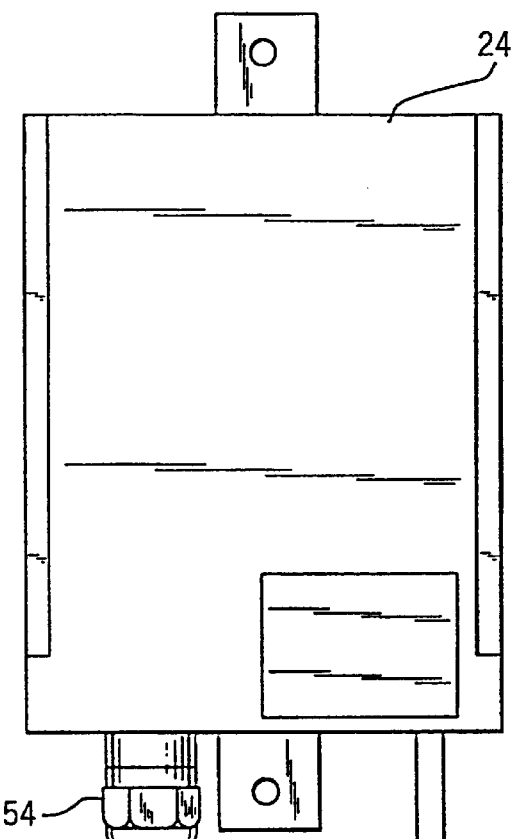
FIG. 4 is a front elevational view of a gateway node.

The gateway node 24 is shown in FIG. 4. The gateway node 24 is typically located on top of a power pole so that it may act as a communication node between LAN 32 and WAN 34. It thus functions as the LAN to WAN connection. The gateway node 24 includes an antenna 52 for receiving and transmitting data over the communication links, and a power line carrier connector 54 for connecting a power line to power the gateway node 24. The gateway node 24 may also be solar powered. The compact design allows for easy placement on any existing utility pole or similarly situated elevated location. The gateway node 24 provides end to end communications from the meter to the utility. The wireless gateway node 24 interfaces with the interface management unit 22 over a two-way 900 MHz spread spectrum LAN 32. Also, the gateway node 24 will interface and be compatible with any WAN 34 for communicating with the utility. The gateway node 24 is field programmable to meet a variety of data reporting needs.

The gateway node 24 receives data requests for water, gas and electric meter data, interrogates the meter and forwards usage information, as well as condition status data, over the WAN 34 to the utility 30. It also provides communication links with other safety, security and information nodes. The gateway node 24 exchanges data with certain, predetermined, interface management units for which it is responsible, and "listens" for signals from those interface management units. The gateway node 24 does not store data for extended periods, thus minimizing security risks. The gateway node's RF communication range is typically one mile.

The relay node 26 acts as an intermediate transceiver to provide additional power boost to get the RF signal from the interface management unit 22 to the gateway node 24. The relay node 26 can be either solar powered or powered through a power line carrier connection. The same RF transceiver circuitry found in the interface management unit 22 and the gateway node 24 is utilized in the relay node 26.

A wide variety of fixed wide area network (WAN) communication systems such as those employed with two-way pagers, cellular telephones, conventional telephones, personal communication services (PCS), cellular digital packet data (CDPD) systems, and satellites may be used to communicate data between the gateway nodes and the utility. The data communication system utilizes channelized direct sequence spread spectrum transmissions for communicating between the interface management units, relay nodes and gateway nodes.

Circuitry of Interface Management Unit

Figure 7:
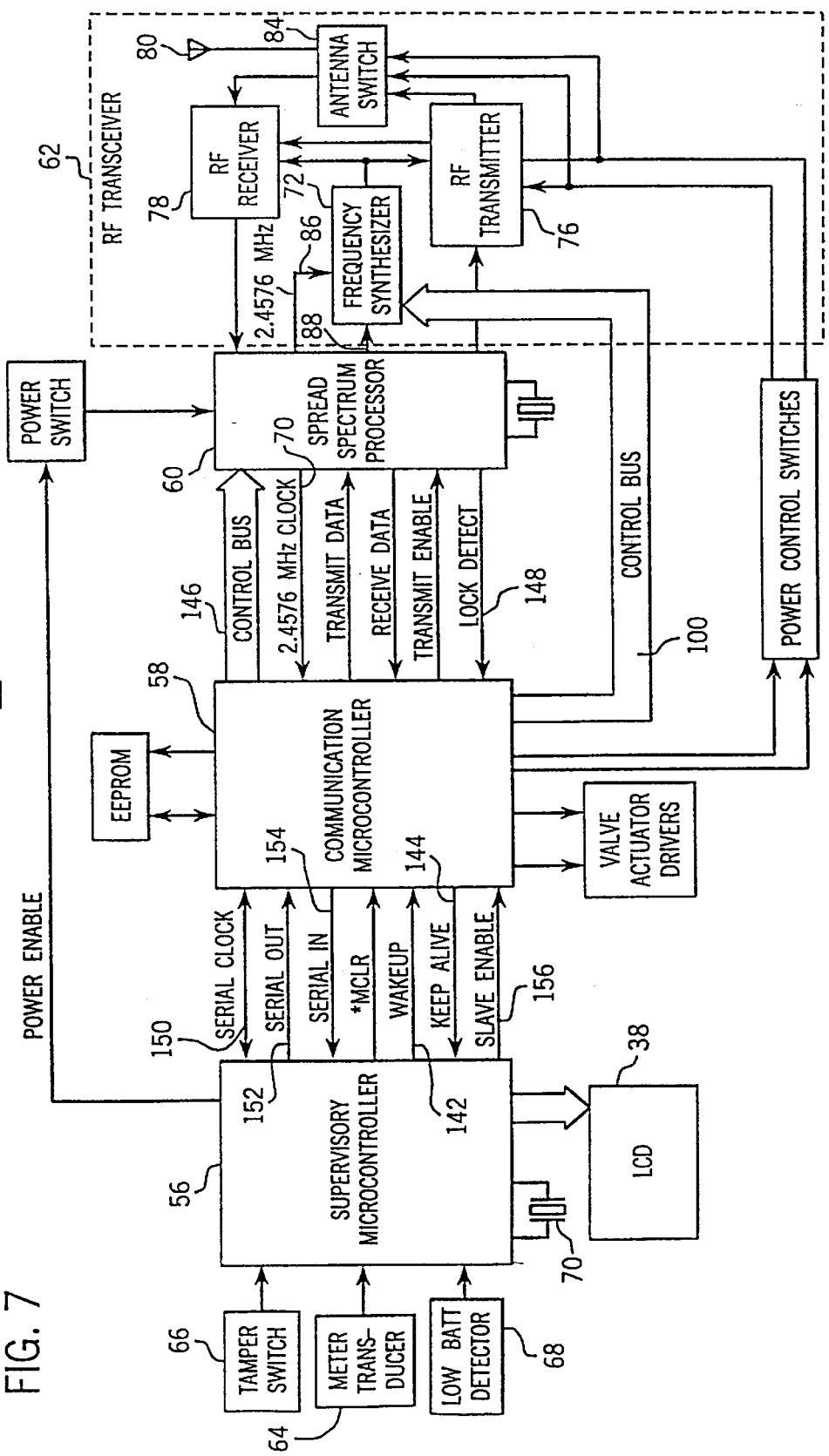
FIG. 7 is a block diagram of the interface management unit circuitry.

FIG. 7 shows a block diagram of a half duplex channelized, direct sequence, spread spectrum circuit board 44 within interface management unit 22. The circuit board is composed of four major functional components; supervisory microcontroller 56, communication microcontroller 58, spread spectrum processor 60, and radio frequency (RF) transceiver 62.

supervisory microcontroller 56 carries out the primary interface function between interface management unit 22 and meter 28. This includes detecting and accumulating pulses from utility meter transducer 64. The accumulated pulse totalization may be converted to corresponding units of commodity volume and the results displayed on liquid crystal display (LCD) 38 to provide a visual indication of commodity consumption. The supervisory microcontroller also monitors inputs from tamper switch 66 for unauthorized use or status reporting. The microcontroller 56 is coupled to a low battery detector 68 for monitoring battery power.

This microcontroller 56 also includes the data systems supervisory timer which controls power management functions. During normal operation supervisory microcontroller 56 is running at a predetermined clock speed, for example 32.768 KHz, which is provided by an external crystal oscillator 70. All other components in the interface management unit 22 are either in a low power "sleep" mode or have power completely removed from them. Periodically, supervisory microcontroller 56 applies power to the other components and "wakes" them "up" to ascertain whether an interrogating RP signal from gateway node 24 is present or not. The wake up power application may occur every 2–8 seconds, typically. If an interrogatory signal is not present, power is removed from the other components or they are returned to the low power sleep mode. This technique is used to conserve battery power, and thus extend battery life. If a valid interrogatory signal is present, interface management unit 22 will transmit data to relay node 26 or gateway node 24.

Supervisory microcontroller 56 may comprise the microprocessor component sold by Toshiba of Japan under the designation TMP47P422VN.

Communication microcontroller 58 is responsible for all aspects of radio frequency (RF) communication management in interface management unit 22 including determining whether or not any given RF signal is a valid interrogating signal and performing the actual data interchange with gateway node 24. Microcontroller 58 provides control information to spread spectrum processor 60 and RP transceiver 62 to control spread spectrum protocol and RF channelization.

As noted above, when communication microcontroller 58 is not performing communication activities it is in a "sleep" mode.

Communication microcontroller 58 may comprise the microprocessor component sold by Microchip of Chandler, Ariz. under the designation PIC16LC74-04/L.

As noted above, data communication system 20 of the present invention preferably employs spread spectrum communications between interface management unit 22 and gateway node 24, or relay node 26.

The spread spectrum communication technique makes use of a sequential noise-like signal structure, for example, pseudo-noise (PN) codes to spread a normally narrowband information signal over a relatively wide band of frequencies. The receiver correlates these signals to retrieve the original information signal. The technique may be further understood by reference to U.S. Pat. No. 5,166,952 and the numerous publications cited therein.

The use of the spread spectrum communication technique, when used in conjunction with the direct sequence modulation technique, hereinafter described, gives data communications system 20 a measure of security, increased immunity from interference and the potential for operating more than one interface management unit within a given environment. The improved signal to noise ratio allows the system to operate with increased range. These communication techniques also avoid the need to obtain licensure from governmental authorities controlling radio communication.

Spread spectrum processor 60 functions to perform spread spectrum encoding of the data from communication microcontroller 58 provided to RF transceiver 62 and decoding of the spread spectrum data from the RF transceiver. The spread spectrum processor also generates the 2.4576 MHz clock signal for communication microcontroller 58 and the frequency synthesizer 72 of RF transceiver 62. The spread spectrum processor 60 may comprise an application specific integrated circuit (ASIC) gate array made and sold by Cylink Corporation of Sunnyvale, California, under the designation SST32ADL which contains a 9.8304 MHz crystal oscillator 74, data registers, and encoding/decoding logic.

The encoding/decoding logic of spread spectrum processor 60 samples the incoming serial data from the communication microcontroller and converts it into a 32 bit pseudo-noise (PN) encoded data stream at a rate which is divided from crystal oscillator 74 by a factor of 192. The PN sequence represents two data input samples. Each pair of the serial data bits or "dibits" is represented by a unique 32 bit PN sequence.

Figure 8:
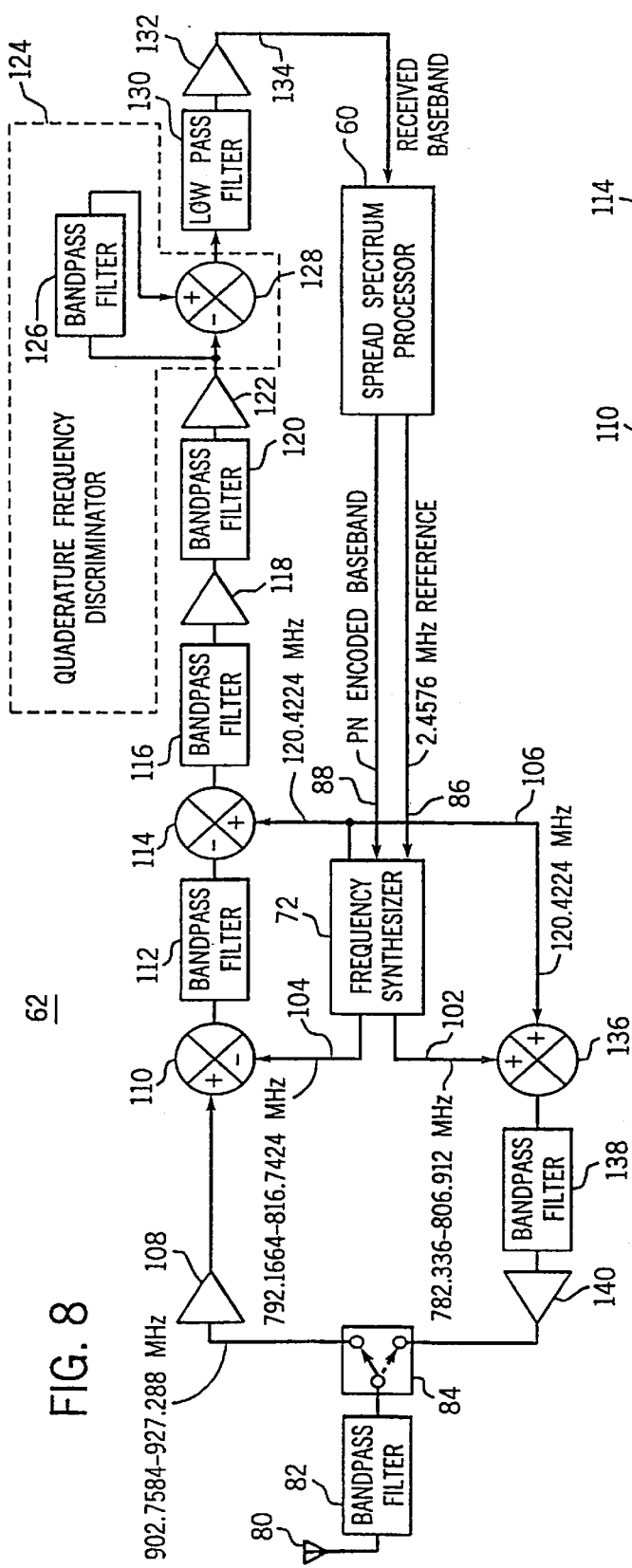
FIG. 8 is a block diagram of the RF transceiver of the interface management unit, the relay node and the gateway node.

FIG. 8 shows a block diagram of RF transceiver 62 of interface management unit 22.

Communication to and from interface management unit 22 may be carried out in one of a preselected number, for example 24 channels in a preselected frequency band, for example 902–928 MHz. Interface management unit 22 receives data and transmits a response on a single RF channel which is the same for both transmit and receive operation. As hereinafter described, the specific RF channel used for communication is chosen during commissioning and installation of the unit and loaded into memory. The RF channel is chosen to be different from the operating channels of other, adjacent interface management units, thereby to prevent two or more interface management units from responding to the same interrogation signal.

Frequency synthesizer 72 performs the modulation and demodulation of the spread spectrum data provided by spread spectrum processor 60 onto a carrier signal and demodulation of such data from the carrier signal. The RF transceiver has separate transmitter 76 and receiver 78 sections fed from frequency synthesizer 72 which is shared by the two sections.

Antenna 80 is coupled through band pass filter 82 to a transmit-receive antenna switch 84, operated by communication microcontroller 58, which connects the desired one of transmitter 76 or receiver 78 to antenna 80.

The output of spread spectrum processor 60 to frequency synthesizer 72 comprises a 2.4576 MHz reference frequency signal in conductor 86 and a PN encoded base band signal in conductor 88. Frequency synthesizer 72 may comprise a National Semiconductor LMX2332A Dual Frequency Synthesizer.

The direct sequence modulation technique employed by frequency synthesizer 72 uses a high rate binary code (PN code) to modulate the base band signal. The resulting spread signal is used to modulate the transmitter's RF carrier signal. The spreading code is a fixed length PN sequence of bits, called chips, which is constantly being recycled. The pseudo-random nature of the sequence achieves the desired signal spreading, and the fixed sequence allows the code to be replicated in the receiver for recovery of the signal. Therefore, in direct sequence, the base band signal is modulated with the PN code spreading function, and the carrier is modulated to produce the wide band signal.

Minimum shift keying (MSK) modulation is used in order to allow reliable communications, efficient use of the radio spectrum, and to keep the component count and power consumption low. The modulation performed by frequency synthesizer 72 is minimum shift keying (MSK) at a chip rate of 819.2 Kchips per second, yielding a transmission with a 6 dB instantaneous bandwidth of 670.5 KHz.

The receiver bandwidth of interface management unit 22 is nominally 1 MHz, with a minimum bandwidth of 900 KHz. Frequency resolution of the synthesizer is 0.2048-MHz, which will be used to channelize the band into 24 channels spaced a minimum of 1.024 MHz apart. This frequency channelization is used to minimize interference between interface management units within a common communication range as well as providing growth for future, advanced features associated with the data communication system.

Figure 9:
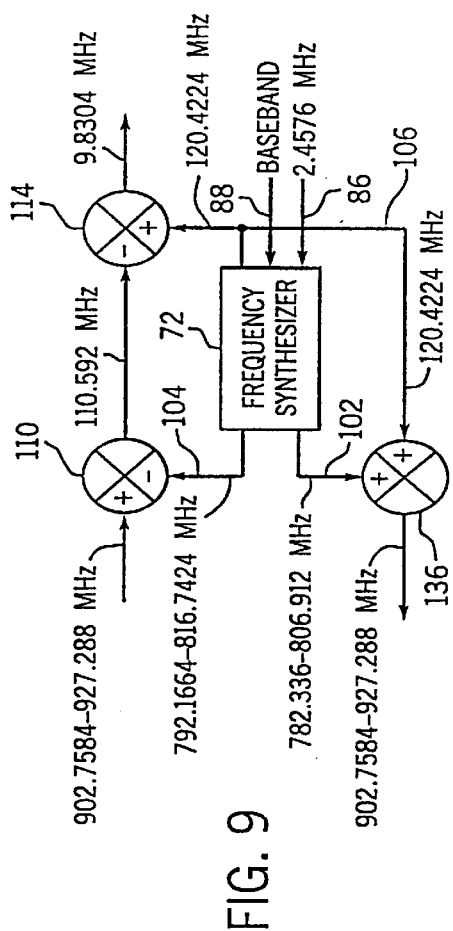
FIG. 9 is a block diagram of the frequency synthesizer portion of the RF transceiver of FIG. 8.

Frequency control of the RF related oscillators in the system is provided by dual phase locked loop (PLL) circuitry within frequency synthesizer 72. The phase locked loops are controlled and programmed by communication microcontroller 58 via a serial programming control bus 100, FIG. 7. As shown in FIG. 9, frequency synthesizer 72 produces two RF signals which are mixed together in various combinations to produce a transmission carrier and to demodulate incoming RF signals. The transmission carrier is based on frequencies in the 782–807 MHz range provided in conductor 102 and the demodulation signal is based on frequencies in the 792–817 MHz range provided in conductor 104. These signals may be referred to as RF transmit and RF receive local oscillation signals.

Table I below is a summary of the transmission channel frequencies and associated frequency synthesizer transmit/receive outputs in conductors 102 and 104. The signals in the table are provided by the two PLL sections in the dual frequency synthesizer 72.

TABLE I

| Channel Number | Channel Frequency (MHz) | Transmit Local Oscillation (MHz) | Receive Local Oscillation (MHz) |
|---|---|---|---|
| 0 | 902.7584 | 782.3360 | 792.1664 |
| 1 | 903.7824 | 783.3600 | 793.1904 |
| 2 | 904.8064 | 784.3840 | 794.2144 |
| 3 | 905.8304 | 785.4080 | 795.2384 |
| 4 | 906.8544 | 786.4320 | 796.2624 |
| 5 | 907.8784 | 787.4560 | 797.2864 |
| 6 | 908.9024 | 788.4800 | 798.3104 |
| 7 | 910.1312 | 789.7088 | 799.5392 |
| 8 | 911.1552 | 790.7328 | 800.5632 |
| 9 | 912.1792 | 791.7568 | 801.5872 |
| 10 | 913.2032 | 792.7808 | 802.6112 |
| 11 | 914.2272 | 793.8048 | 803.6352 |
| 12 | 915.2512 | 794.8288 | 804.6592 |
| 13 | 916.2752 | 795.8528 | 805.6832 |
| 14 | 917.2992 | 796.8768 | 806.7072 |
| 15 | 918.3232 | 797.9008 | 807.7312 |
| 16 | 919.9616 | 799.5392 | 809.3696 |
| 17 | 920.9856 | 800.5632 | 810.3936 |
| 18 | 922.0096 | 801.5872 | 811.4176 |
| 19 | 923.2384 | 802.8160 | 812.6464 |
| 20 | 924.2624 | 803.8400 | 813.6704 |
| 21 | 925.2864 | 804.8640 | 814.6944 |
| 22 | 926.3104 | 805.8880 | 815.7184 |
| 23 | 927.3344 | 806.9120 | 816.7424 |

A third signal, which is fixed at 120.4224 MHz, is also supplied by the dual frequency synthesizer. This signal is supplied to conductor 106 and may be referred to as the intermediate frequency (IF) local oscillation signal.

RF receiver section 78 of RF transceiver 62 includes low noise amplifier 108, the input of which is connected to transmit-receive switch 84. The output of low noise amplifier 108 is connected to intermediate frequency (IF) signal mixer 110. The other input to signal mixer 110 is the output from frequency synthesizer 72 in conductor 104. The output of signal mixer 110 is an intermediate frequency signal which is passed through band pass filter 112 to intermediate frequency signal mixer 114. The other input to intermediate frequency signal mixer 114 is the 120.4224 MHz fixed frequency signal from frequency synthesizer 72 in conductor 106. Intermediate frequency signal mixer 114 converts the received signals to a final intermediate frequency of, for example, 9.8304 MHz.

The intermediate frequency signal from intermediate frequency signal mixer 114 is passed through band pass limiting circuitry comprising band pass filter 116, amplifier 118, band pass filter 120, and amplifier 122.

The signal from amplifier 122 is provided to quadrature frequency discriminator 124 comprised of band pass filter 126 and signal mixer 128. The output of frequency discriminator 124 is provided to a linear phase low pass filter 130 and a voltage comparator 132. The output of voltage comparator 132 in conductor 134 comprises the received baseband data signal for interface management unit 22. The signal in conductor 134 is provided to spread spectrum processor 60, and in turn, to communication microcontroller 58.

In transmission mode, frequency synthesizer 72 provides a signal having a frequency in the 782–807 MHz range in conductor 102, modulated with the data to be transmitted. RF transmitter section 76 includes signal mixer 136 which mixes the signal in conductor 102 with the fixed frequency IF local oscillator signal in conductor 106. This results in an RF signal which ranges between 902 MHz and 928 MHz. The signal is filtered by bandpass filter 138 to reduce harmonics and out of band signals, amplified by a medium power amplifier 138 and supplied to transmit/receive switch 84.

Operation of Interface Management Unit

Figure 11A:
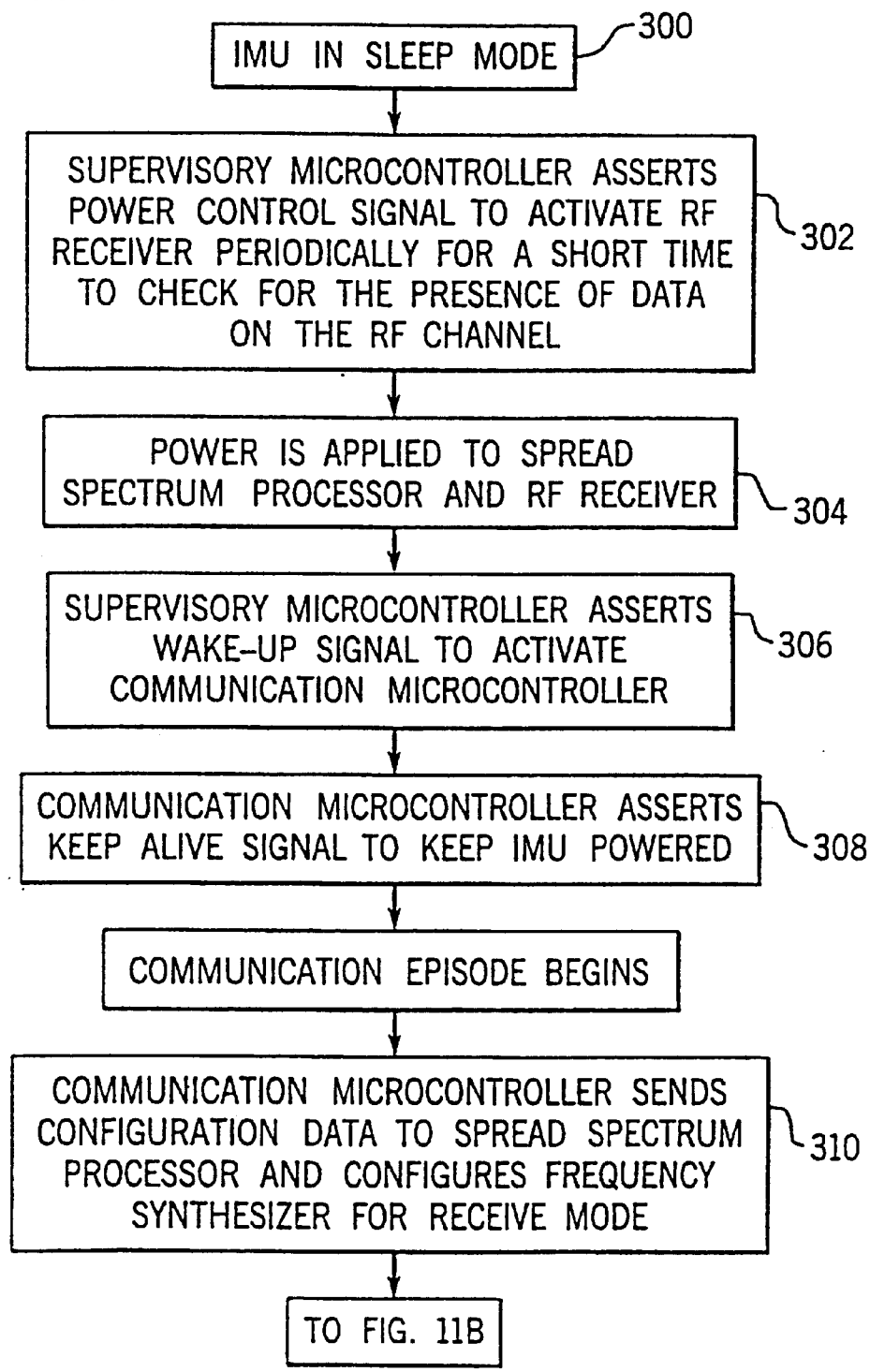
FIG. 11A is a flow diagram of the operation of the interface management unit in power management and communication.
Figure 11B:
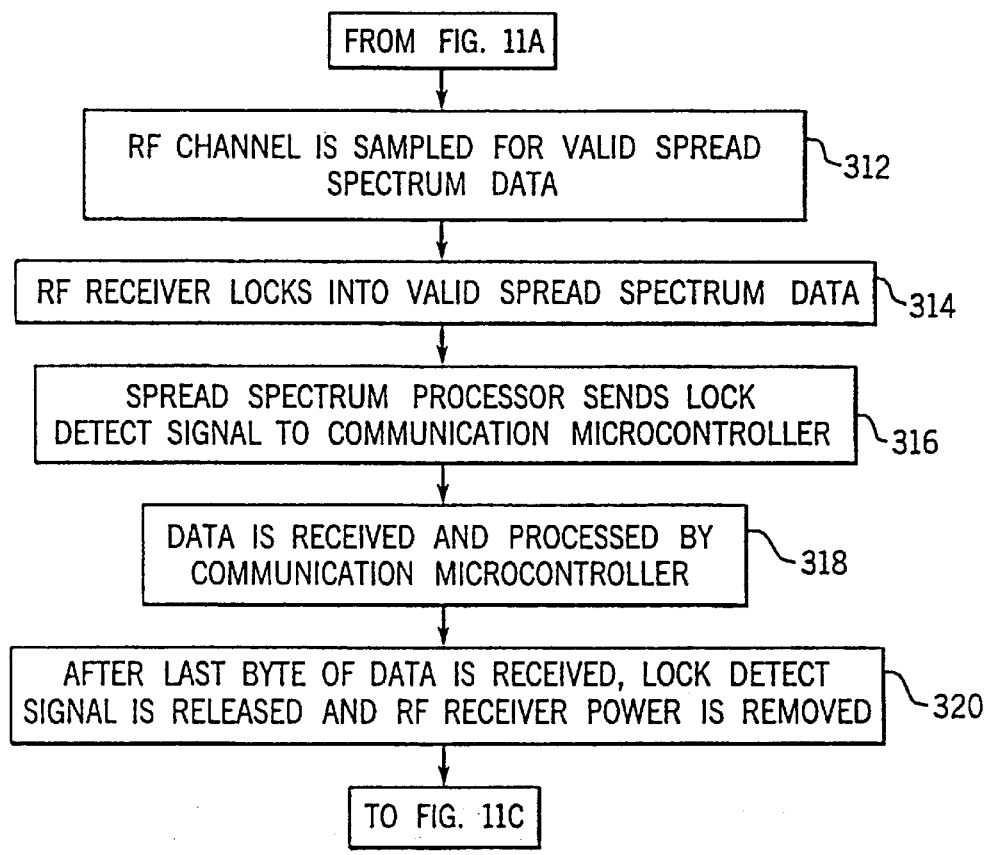
FIG. 11B is a continuation of the flow diagram of FIG. 11A.

System timing and power management within the interface management unit 22 are controlled by supervisory microcontroller 56. The communications hardware of the unit is periodically powered up from a sleep mode to test for the presence of an interrogating signal from gateway node 24. FIGS. 11A–11C is a flow diagram of the power management and system communication of the interface management unit 22 in accordance with the present invention.

Referring now to FIGS. 7 and 11A–C, a request communications episode comprises three different phases: a wake-up interval of the communications hardware of the interface management unit, sometimes called "blinking"; the polling data from the gateway node; and a response by the interface management unit. The response may include the meter count indicative of the amount of commodity consumed.

Because of the need to conserve battery power, the interface management unit is operated in a pulsed mode where it wakes up from a sleep mode periodically, typically 2–8 seconds. The interface management unit starts off in sleep mode as shown in FIGS. 11A by reference numeral 300.

Referring now to FIGS. 11A–11C, responsive to a signal from supervisory microcontroller 56, communication microcontroller 58 will activate RF receiver 78 periodically for a short time, or "blink" interval, to determine the presence of a signal from gateway node 24 on the RF channel established for the interface management unit. See step 302. The signal from gateway node 24 comprises spread spectrum PN data recognizable by interface management unit 22 as a valid interrogator signal. If no spread spectrum PN data is seen, or the data which is there is determined to be invalid, receiver 78 shuts down or goes back to "sleep." If the PN sequence is recognized as valid, receiver 78 will remain on until the communication episode is complete.

Since the interface management unit 22 is not listening continuously for data it is necessary for gateway node 24 to "wake up" the interface management unit before sending data to it. Polling or commissioning data will be sent only after the interface management unit has had sufficient time to wake up. It will respond with the requested information shortly after polling has terminated. Once the communication episode is finished the interface management unit will resume its normal behavior of blinking to test for the presence of a signal from the data interrogator in the RF channel.

A blink cycle begins with supervisory microcontroller 56 asserting the power control line low which applies power to spread spectrum processor 60 and starts all oscillators in the interface management unit 22, step 304. After the supervisory microcontroller has allowed time for the oscillators to start and stabilize, it provides a pulse on wake up line 142 to activate communication microcontroller 58, step 306. Communication microcontroller 58 generates a "keep alive" signal to supervisory microcontroller 56 in line 144 to indicate to supervisory microcontroller 56 that it has activities in progress and that supervisory microcontroller 56 must continue to maintain the components of interface management unit 22 in the operations condition. This occurs in step 308.

The next step, step 310 in the communication process is polling by gateway node 24. For any meaningful data interchange to occur it is necessary to load spread spectrum processor 60 with its PN codes and mode control data. In this code, every pair of serial data bits, termed a "dibit", is represented by a unique 32 bit PN sequence. It is also necessary to load MSK frequency synthesizer 72 with the proper channel programming data via control bus 100. Spread spectrum data is transferred between communication microcontroller 58 and spread spectrum processor 60 via 8 bit control bus 146.

After frequency synthesizer 72 is programmed to the correct RF channel, it is time to sample the RF channel for valid spread spectrum data. See steps 312 and 314. Direct sequence spread spectrum serial data is transferred at a rate of 2400 bits per second for all communication episodes.

When RF transceiver 62 is stabilized, there will be demodulated data available at the input of spread spectrum processor 60. In the event that valid codes are received, spread spectrum processor 60 will assert the "lock detect" signal 148 to communication microcontroller 58 at step 316. If a lock detect signal is not asserted in conductor 148 within a predefined time period, interface management unit 22 will revert back to its sleep mode. Assuming, however, that lock detect did occur, there will be serial data present at the input of communication microcontroller 58. See step 318. When gateway node 24 has finished sending its packet of data it will cease transmitting over the RF channel, causing a loss of the lock detect signal at some random time after the end of the transmission. Once lock detect is lost, power to RF receiver 78 is removed. See step 320.

The serial data at the input to communication microcontroller 58 is decoded by the communication microcontroller and the validity of the received message is determined. If the message is correctly formatted and the serial number data contained in the message matches the serial number of the interface management unit that received it, then data is interchanged with the supervisory microcontroller 56 via serial data conductors 150, 152, and 154, with communication microcontroller 58 acting as the master. A message is sent from communication microcontroller 58 to supervisory microcontroller 56. When supervisory microcontroller 56 responds, it will reverse the direction of the master/slave relationship on the serial interface system by a asserting the slave enable signal in conductor 156. Data is then sent back using the supervisory microcontroller as the serial interface clock. The slave enable signal is removed when the message is completed. See steps 322, 324, 326, and 328.

This data interchange will occur for every received message except a valve actuation message and a request for serial number message. If there is no data interchange required, a response to that effect is sent.

After the requested data (if any) is returned from supervisory microcontroller 56 to communication microcontroller 58, a return message to gateway node 24 is formulated at step 330. When communication microcontroller 58 is ready to transmit, it must reprogram frequency synthesizer 72 to change its frequency offset. This is accomplished over control bus 100. The RF transmitter 76 and spread spectrum processor 60 are then enabled to transmit a response by the interface management unit 22. After spread spectrum processor 60 has had time to stabilize, the return message is sent. This message is terminated by disabling spread spectrum processor 60 and RF transmitter 76. See steps 332 through 340.

Following completion of transmission, RF receiver 78 is activated once again to check for more incoming data as at step 342. This is done to allow multiple messages to be interchanged once interface management unit 22 has been awakened without the need to complete a wake up cycle for each message. If communication microcontroller 58 does not detect the presence of any incoming messages within a given time period it will cause interface management unit 22 to return to its sleep mode. Step 344. Frequency synthesizer 72 is commanded to revert to its low power mode by a message on control bus 100 and the keep alive signal in conductor 144 to supervisory microcontroller 56 is released to tell the supervisory microcontroller that communication has ended. Step 346. Supervisory microcontroller 56 then removes power to the remaining portions of interface management unit 22. Step 348.

Communication between supervisory microcontroller 56 and the communication microcontroller 58 is accomplished via the serial interface bus comprised of signals 150, 152 and 154. All interprocessor communication consists of a control code byte, a data byte, and a check sum byte. Messages that request information consist of only the control code byte and the check sum byte. The check sum is a twos complement check sum.

An example communications episode can be described as follows:

The RF receiver 78 of interface management unit 22 wakes up, sees no data, and goes back to sleep. The second time the RF receiver wakes up it sees the spread spectrum PN sequence from gateway node 24, recognizes it, and waits for polling data to emerge from spread spectrum processor 60. Once the unit is awake, it will receive and decode the polling message from gateway node 24 and formulate an appropriate response.

During the wake up interval, gateway node 24 transmits a continuous idle condition to allow spread spectrum processor 60 to synchronize and to assure that the interface management unit blink window is open long enough to see the incoming PN sequences. Once code lock is achieved the listen interval will extend to accommodate the incoming data, because the wake up is deemed successful if code lock is achieved. If code lock occurs but a message fails to be recognized or no data is seen within the specified time window, then the communication microcontroller 58 will go back to sleep.

After the unit 22 has been successfully awakened, the gateway node 24 must command it to perform one of many predefined functions. When the unit responds to a message, it echoes the control word back with the highest order bit cleared along with the meter serial number as a confirmation of the origin of the return message. This scheme should assure that gateway node 24 will not respond to any return data which did not originate from the intended interface management unit 22.

Each data message starts with a predefined control code followed by the necessary data and a check sum of all bytes up to the check sum byte. The check sum is calculated by taking the twos complement of the sum of all bytes preceding the check sum byte. This allows testing the check sum by adding all of the message bytes, including the check sum, and testing for a result of zero. Data types used for data interchange include the following: meter count, utility serial number, RF channel, unit of measure, meter type, conversion factor, error code, actuator port, transmit, count, company identifier, software version and manufacturer serial number.

Circuitry of Gateway Node

Figure 10:
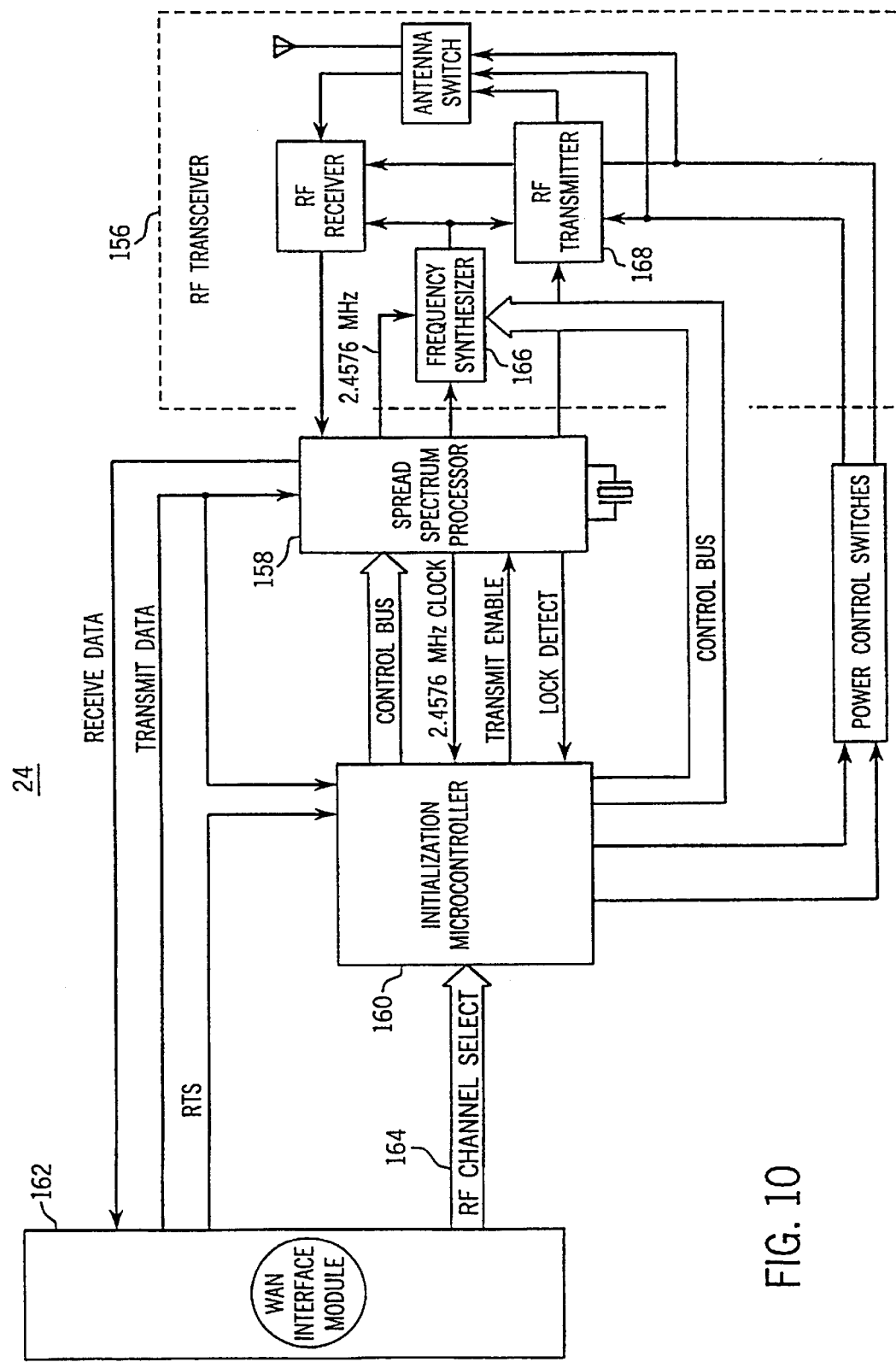
FIG. 10 is a block diagram of the gateway node circuitry.

FIG. 10 shows a block diagram of the gateway node circuitry. The RF transceiver section 156 of gateway node 24 is the same as the RF transceiver section 62 of interface management unit 22. Spread spectrum processor 158 is also the same as spread spectrum processor 60 in interface management unit 22 so that frequency synthesis, modulation, demodulation, and spread spectrum control in gateway node 24 are equivalent to that found in interface management unit 22.

The communication and supervisory microcontrollers 58, 56 in interface management unit 22 are replaced by an initialization microcontroller 160 and WAN interface module 162, respectively. WAN interface module 162 may incorporate electronic circuitry for a two-way pager, power line carrier (PLC), satellite, cellular telephone, fiber optics, cellular digital packet data (CDPD) system, personal communication services (PCS), or other fixed wide area network (WAN) system. The construction of WAN interface module 162 and initialization microcontroller 160 may change depending on the desired WAN interface. RF channel selection is accomplished through an RF channel select bus 164 which interfaces directly with the initialization microcontroller 160.

Initialization microcontroller 160 controls all node functions including programming spread spectrum processor 158, RF channel selection in frequency synthesizer 166 of RF transceiver 156, transmit/receive switching, and detecting failures in WAN interface module 162. Upon power up, initialization microcontroller 160 will program the internal registers of spread spectrum processor 158, read the RF channel selection from the interface management unit 22, and set the system for communication at the frequency corresponding to the channel selected by the interface management unit 22.

Selection of the RF channel used for transmission and reception is accomplished via the RF channel select bus 164 to initialization microcontroller 160. Valid channel numbers range from 0 to 23. In order to minimize a possibility of noise on the input to initialization microcontroller 160 causing false channel switching, the inputs have been debounced through software. Channel selection data must be present and stable on the inputs to initialization microcontroller 160 for approximately 250 $\mu$s before the initialization microcontroller will accept it and initiate a channel change. After the channel change has been initiated, it takes about 600 μs for frequency synthesizer 166 of RF transceiver 156 to receive the programming data and for the oscillators in the frequency synthesizer to settle to the changed frequency. Channel selection may only be completed while gateway node 24 is in the receive mode. If the RF channel select lines are changed during the transmit mode the change will not take effect until after the gateway node has been returned to the receive mode.

Once initial parameters are established, initialization microcontroller 160 begins its monitoring functions. When gateway node 24 is in the receive mode, the initialization microcontroller 160 continuously monitors RF channel select bus 164 to determine if a channel change is to be implemented.

For receiving data, gateway node 24 monitors the interface management unit 22 to determine the presence of data. Some additional handshaking hardware may be required to sense the presence of a spread spectrum signal.

An alarm message is sent automatically by interface management unit 22 in the event of a tamper or alarm condition of meter 28. The message is sent periodically until the error has cleared. Gateway node 24 must know how many bytes of data it is expecting to see and count them as they come in. When the proper number of bytes is received, reception is deemed complete and the message is processed. Any deviation from the anticipated number of received bytes may be assumed to be an erroneous message.

During the transmit mode of gateway node 24, initialization microcontroller 160 monitors the data line to detect idle conditions, start bits, and stop bits. This is done to prevent gateway node 24 from continuously transmitting meaningless information in the event a failure of WAN interface module 162 occurs and also to prevent erroneous trailing edge data from being sent which cannot terminate transmissions in a timely fashion. The initialization microcontroller 160 will not enable RF transmitter 168 of RF transceiver 156 unless the data line is in the invalid idle state when communication is initiated.

A second watchdog function of initialization microcontroller 160 when gateway node 24 is in the transmit mode is to test for valid start and stop bits in the serial data stream being transmitted. This ensures that data is read correctly. The first start bit is defined as the first falling edge of serial data after it has entered the idle stage. All further timing during that communication episode is referenced from that start bit. Timing for the location of a stop bit is measured from the leading edge of a start bit for that particular byte of data. Initialization microcontroller 160 measures an interval which is 9.5 bit times from that start bit edge and then looks for a stop bit. Similarly, a timer of 1 bit interval is started from the 9.5 bit point to look for the next start bit. If the following start bit does not assert itself within 1 bit time of a 9.5 bit time marker a failure is declared. The response to a failure condition is to disable RF transmitter 168.

Commissioning of Interface Management Unit

Figure 12:
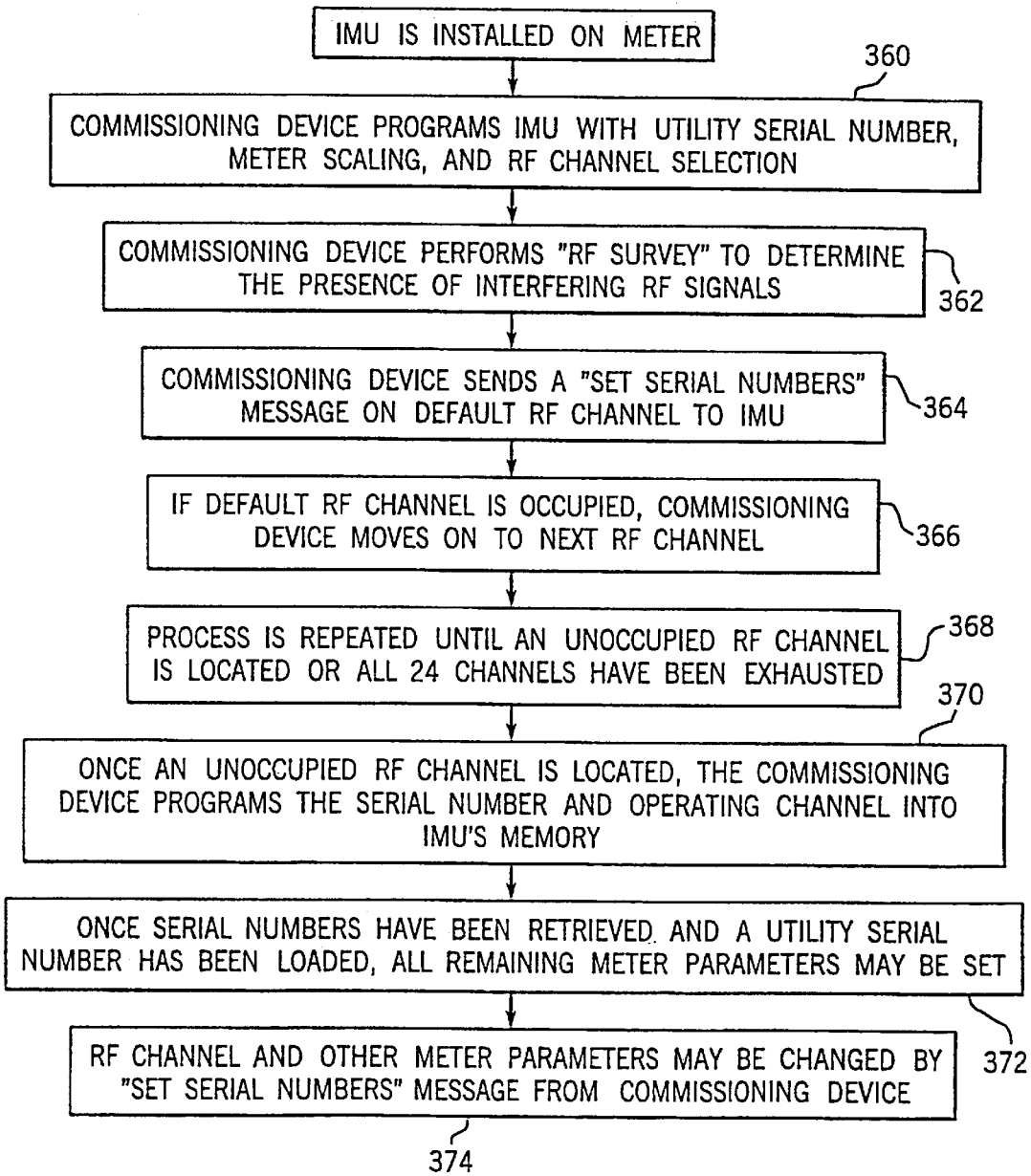
FIG. 12 is a flow diagram of interface management unit commissioning.

When an interface management unit is initially installed it does not contain any utility serial number, meter scaling, or RF channel information. These constants must be programmed during installation and commissioning to allow the interface management unit to interface with the utility billing software and the meter type. A flow diagram of the interface management unit commissioning is shown in FIG. 12.

When an interface management unit is manufactured it will default to the first RF channel in its internal frequency list. This known channel will be used to speed production line testing and interface management unit commissioning. When an interface management unit is installed, a commissioning device will program the interface management unit with a utility serial number, meter scaling characteristics, and RF channel selection data. See step 360. It will then try to obtain a response on the default RF channel first. If there is no response from the default channel, the commissioning device will move to the next channel on the frequency list and repeat the process until the interface management unit responds. This allows a commissioning device to set up new meters as well as to recommission meters which are already in the field.

In order for the interface management unit to function as a part of the network and to co-exist with other interface management units in the area it may be necessary to coordinate their operating frequencies to minimize data collisions. This task must be performed at the time of interface management unit commissioning and will be the responsibility of the commissioning device. In a fixed local area network setting all interface management units could occupy the same frequency since they are accessed one at a time by serial number.

Each interface management unit has a finite distance over which it can transmit and receive RF signals, typically 400 feet. In order for a gateway node to establish successful communication with an interface management unit it must be within that finite distance over which it can transmit and receive RF signals, otherwise it is necessary to install a relay node to boost the RF signal. As mentioned earlier, it is possible to have all interface management units on the same channel in a network setting since there will be unique serial number requests as part of the polling procedure by the gateway node. Even if multiple interface management units hear the polling message, only the designated serial numbered unit will respond.

Assignment of interface management unit frequencies will be performed by the commissioning device at the time of installation. This will be accomplished through the use of an RF survey to determine the presence of interfering interface management units or other conflicting RF signals. See step 362.

Upon survey initiation the commissioning device will perform a send serial numbers message on the first or default RF channel, at step 364. An interface management unit within range of the commissioning device should respond since this is a serial number independent message. If the commissioning device does not get a response on this channel, it will label it as okay for use and the survey will stop. However, should the channel be occupied, the commissioning device will move on to the next channel in the list as shown in step 366. This process will repeat itself until an unoccupied channel is located or all 24 channels have been exhausted. See step 368. Once an unoccupied RF channel is located, the commissioning device programs the utility serial number, the operating RF channel, and all remaining meter-parameters into the interface management unit's memory. See steps 370 and 372. The utility serial number, RF channel and other meter parameters may be changed at any time by a "set serial numbers" message from the commissioning device as outlined in step 374.

The same RF frequencies may be used over and over again. When the installer moves out of the range of an interface management unit on channel 1, for example, this channel becomes available for use again by another interface management unit. This plan is preferable to a preassigned frequency plan since it takes into account actual radio propagation conditions in the area and does not require extensive preplanning or a complicated map of channels.

Operation of Interface Management Unit Virtual Shut-Off Function

Figure 13:
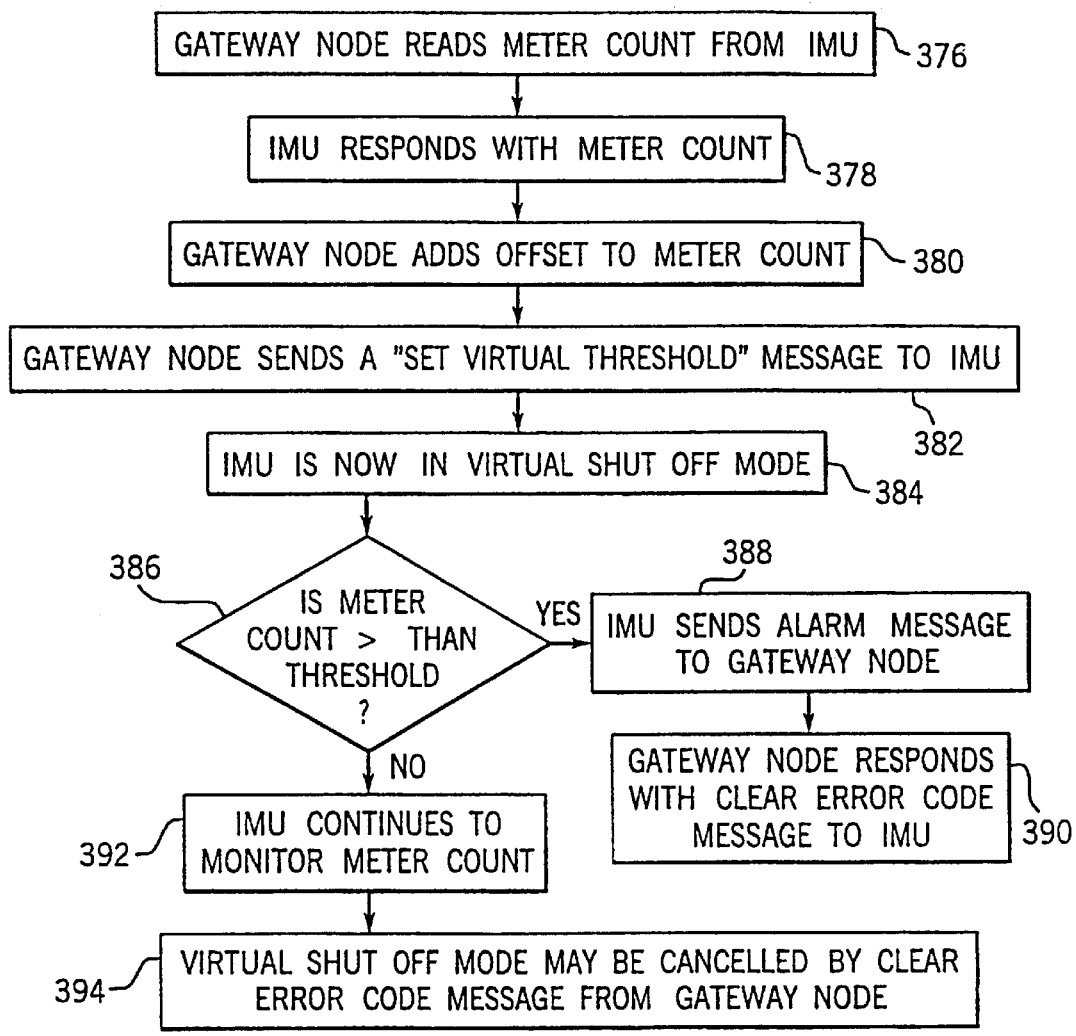
FIG. 13 is a flow diagram of the interface management unit virtual shut-off function.

FIG. 13 shows a flow diagram of the virtual shut-off function of the interface management unit in accordance with the present invention.

The virtual shut-off function of the interface management unit is used for situations such as a change of ownership where a utility service is to be temporarily inactive. When a residence is vacated there should not be any significant consumption of utilities at that location. If there is any meter movement, indicating either a leak or unauthorized usage, the utility needs to be notified. This tamper mode condition provides a means of flagging and reporting meter movement beyond a preset threshold value.

Activation of the virtual shut-off mode is accomplished through the "set virtual threshold" message, defined as a meter count which the interface management unit is not to exceed. In order to know where to set the threshold it is necessary to know the present meter count. The relay node, gateway node, commissioning device, or other interface management unit communication device must read the meter count, steps 376 and 378, add whatever offset is deemed appropriate, step 380, send the result to the interface management unit as a "set virtual shut-off" message at step 382. The interface management unit will then enable the virtual shut-off mode at step 384. The interface management unit then accumulates the meter counts at step 386. If the meter count is greater than the preset threshold value then the interface management unit sends a "send alarm" message to the gateway node until a "clear error code" message is issued in response by the gateway node as detailed in steps 388 and 390. However, if the meter count is not greater than the preset threshold value then the interface management unit continues to monitor the meter count at step 392. The virtual shut-off mode may be canceled at any time by a "clear error code" message from the gateway node at step 394.

If the meter count in the interface management unit does not exceed the preset threshold value at any given sampling time, the unit continues to count (step 392) until the preset threshold count is attained or until operation in the virtual shut-off mode is canceled (step 394).

Automatic Meter Reading Data Communication System

Figure 14:
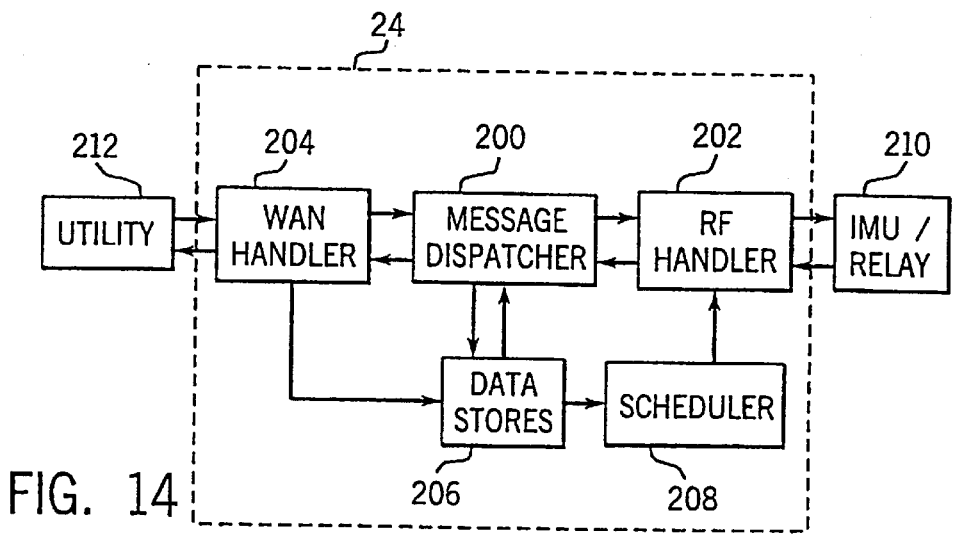
FIG. 14 is a functional diagram of the automatic meter reading data communication system.

FIG. 14 shows a functional flow diagram of the automatic meter reading data communication system of the present invention in which the components are described as functional blocks. A flow diagram includes the main functional components of the gateway note 24 which include a message dispatcher 200, an RF handler 202, a WAN handler 204, a data stores component 206 and a scheduler component 208. The data stores and scheduler components comprise data that is preprogrammed into the gateway node's memory. The gateway node interfaces with an interface management unit or a relay node 210 over the two-way wireless LAN. A gateway node 24 also interfaces with a utility service provider over the fixed common carrier WAN.

Figure 15A:
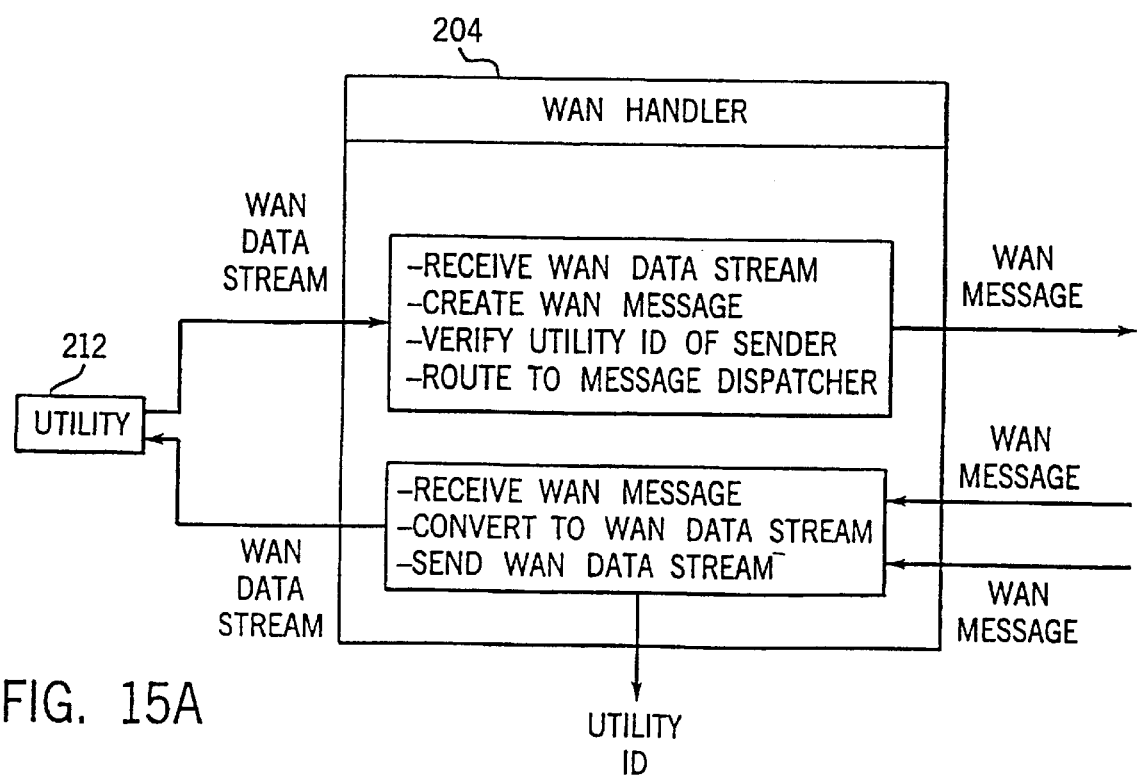
FIG. 15A is a flow diagram of the WAN handler portion of the data communication system of FIG. 14.

FIGS. 15A is a detailed functional diagram of the WAN handler 204 of FIG. 14. In a typical communication episode, the utility. 212 may initiate a request for data from the interface management unit 210 by sending a data stream over the WAN. The WAN handler of the gateway node receives the WAN data stream, creates a WAN message, verifies the utility ID of the sender from the data stores 206 and routes the WAN message to the message dispatcher 200 in the gateway node.

Figure 15B:
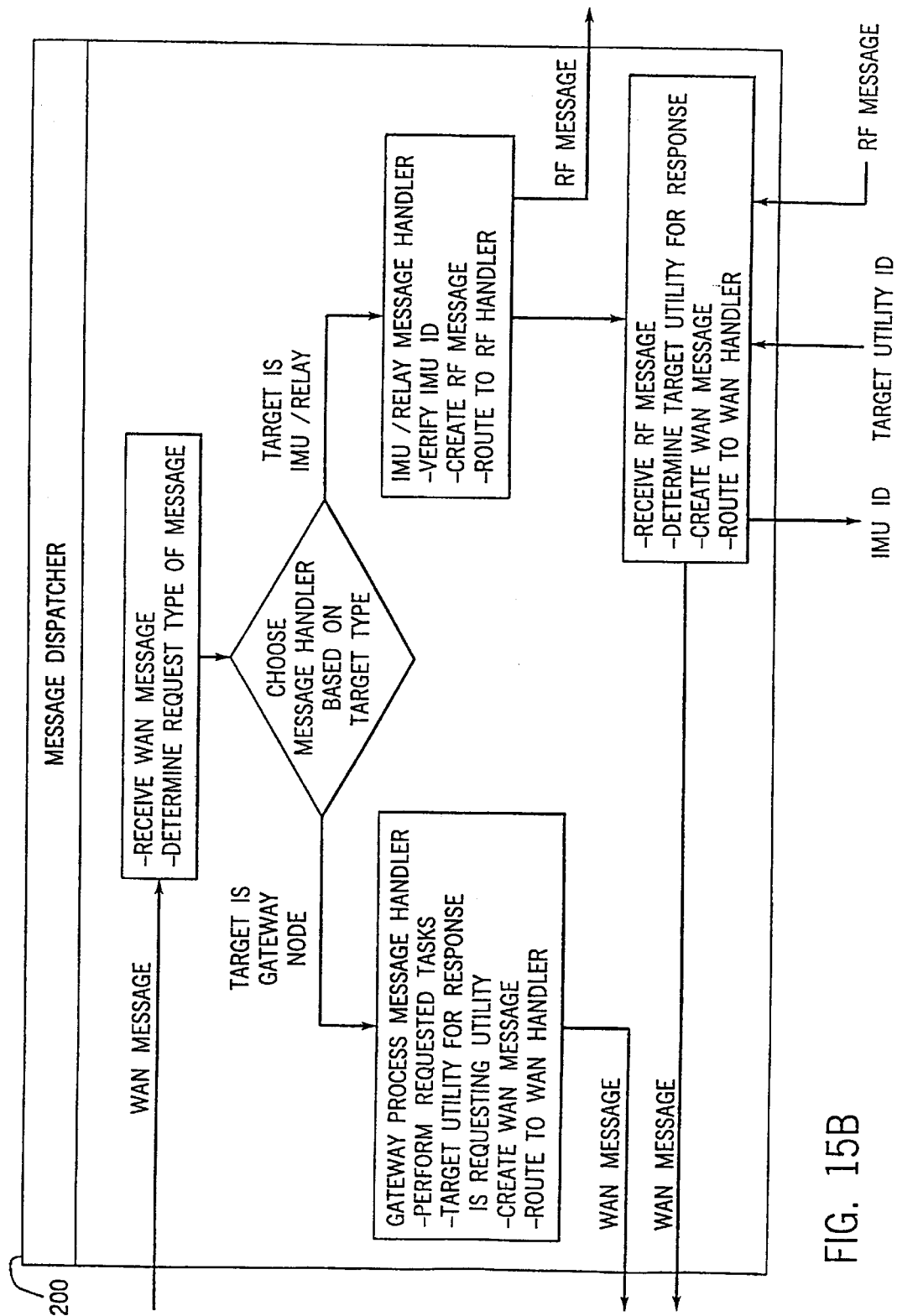
FIG. 15B is a flow diagram of the message dispatcher portion of the data communication system of FIG. 14.

Referring now to FIG. 15B, the message dispatcher 200 receives the WAN message from the WAN handler and determines the request from the utility 212. The message dispatcher 200 determines that the end recipient or target is the interface management unit or relay node 210. The message dispatcher then verifies the interface management unit ID from the data stores 206, creates an RF message and routes the RF message to the RF handler 202.

Figure 15C:
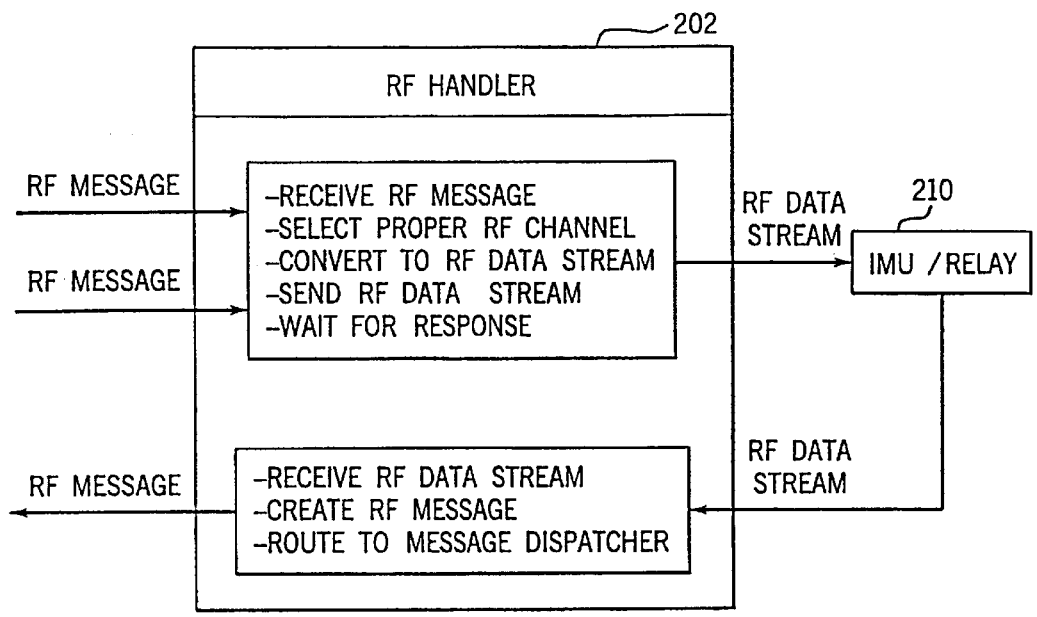
FIG. 15C is a flow diagram of the RF handler portion of the data communication system of FIG. 14.

Referring now to FIG. 15C, the RF handler receives the RF message from the message dispatcher 200, selects a proper RF channel, converts the RF message to an RF data stream, sends the RF data stream to the interface management unit or relay node 210 over the LAN and waits for a response. The interface management unit then responds by sending an RF data stream over the LAN to the RF handler 202 of the gateway node 24. The RF handler 202 receives the RF data stream, creates an RF message from the RF data stream and routes the RF message to the message dispatcher 200. As shown in FIG. 15B, the message dispatcher receives the RF message, determines the target utility for response from the data stores 206, creates a WAN message and routes the WAN message to the WAN handler 204. The WAN handler 204 receives the WAN message from the message dispatcher, converts the WAN message to a WAN data stream and sends the WAN data stream to the utility over the fixed common carrier WAN, as shown in FIG. 15A to complete the communication episode.

Figure 15D:
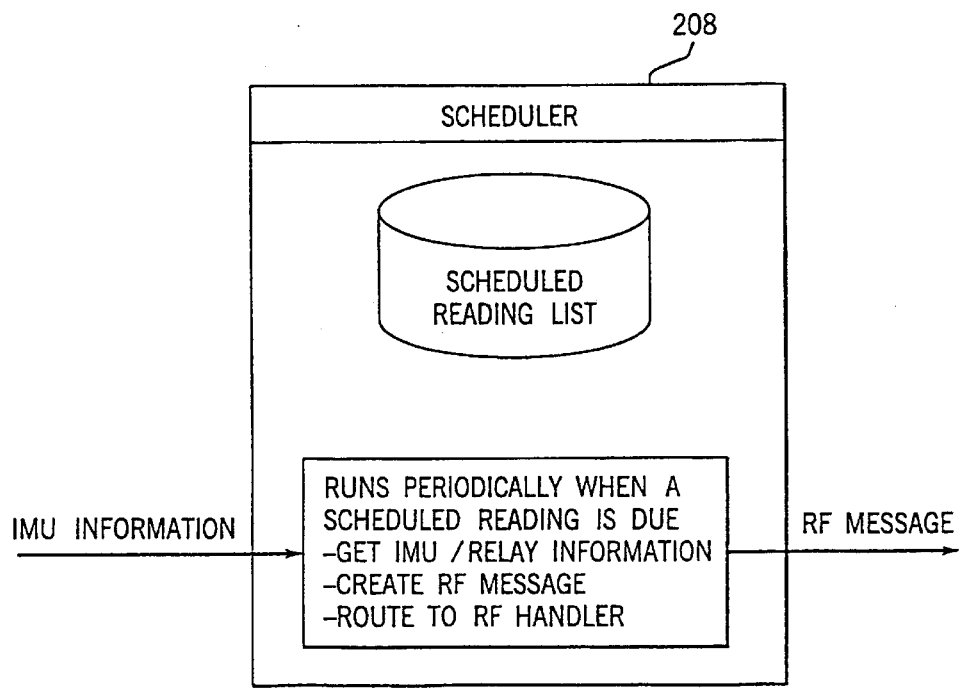
FIG. 15D is a flow diagram of the scheduler portion of the data communication system of FIG. 14.

A communication episode can also be initiated by scheduled readings preprogrammed into the scheduler 208 of the gateway node as shown in FIG. 15D. A list of scheduled reading times is preprogrammed into memory within the gateway node 24. The scheduler 208 runs periodically when a scheduled reading is due. When it is time for a scheduled reading, the scheduler 208 retrieves interface management unit or relay node information from the data stores 206, creates an RF message and routes the RF message to the RF handler 202, receives the RF message, selects a proper RF channel, converts the RF message to an RF data stream, sends the RF data stream to the interface management unit or relay node 210 and waits for a response. The interface management unit then responds with an RF data stream to the RF handler 202. The RF handler 202 receives the RF data stream, creates an RF message from the RF data stream and routes the RF message to the message dispatcher 202. The message dispatcher receives the RF message, determines the target utility for response from the data stores 206, creates a WAN message and routes the WAN message to the WAN handler 204. The WAN handler receives the WAN message, converts the WAN message to a WAN data stream and sends the WAN data stream to the utility 212.

Occasionally, the utility may request data that is stored within the gateway node's memory. In this case, the utility initiates the communication episode by sending a WAN data stream to the WAN handler 204. The WAN handler receives the WAN data stream, creates a WAN message, verifies the utility ID of the sender in the data stores 206 and routes the WAN message to the message dispatcher 200. As shown in FIG. 15B, the message dispatcher 200 receives the WAN message and determines the request from the utility 212. The message dispatcher 200 then determines the target of the message. If the data requested is stored in the gateway node memory, then the gateway node performs the requested task, determines that the requesting utility is the target utility for a response, creates a WAN message and routes the WAN message to the WAN handler 204. The WAN handler 204 receives the WAN message, converts the WAN message to a WAN data stream and sends the WAN data stream to the utility 212.

The last type of communication episode is one which is initiated by the interface management unit. In this case, the interface management unit detects an alarm or tamper condition and sends an RF data stream to the RF handler 202 of the gateway node 24. The RF handler 202 receives the RF data stream, creates an RF message from the RF data stream and routes the RF message to the message dispatcher 200. The message dispatcher 200 receives the RF message, determines the target utility for response from the data stores 206, creates a WAN message and routes the WAN message to the WAN handler 204. The WAN handler receives the WAN message, converts the WAN message to a WAN data stream and sends the WAN data stream to the utility.

There are thus three different types of communication episodes that can be accomplished within the automatic meter reading data communication system shown in FIGS. 14 and 15A–E.

FIG. 15D represents information or data that is preprogrammed into the gateway node's memory. Included within the memory is a list of scheduled reading times to be performed by the interface management unit. These reading times may correspond to monthly or weekly usage readings, etc.

Figure 15E:
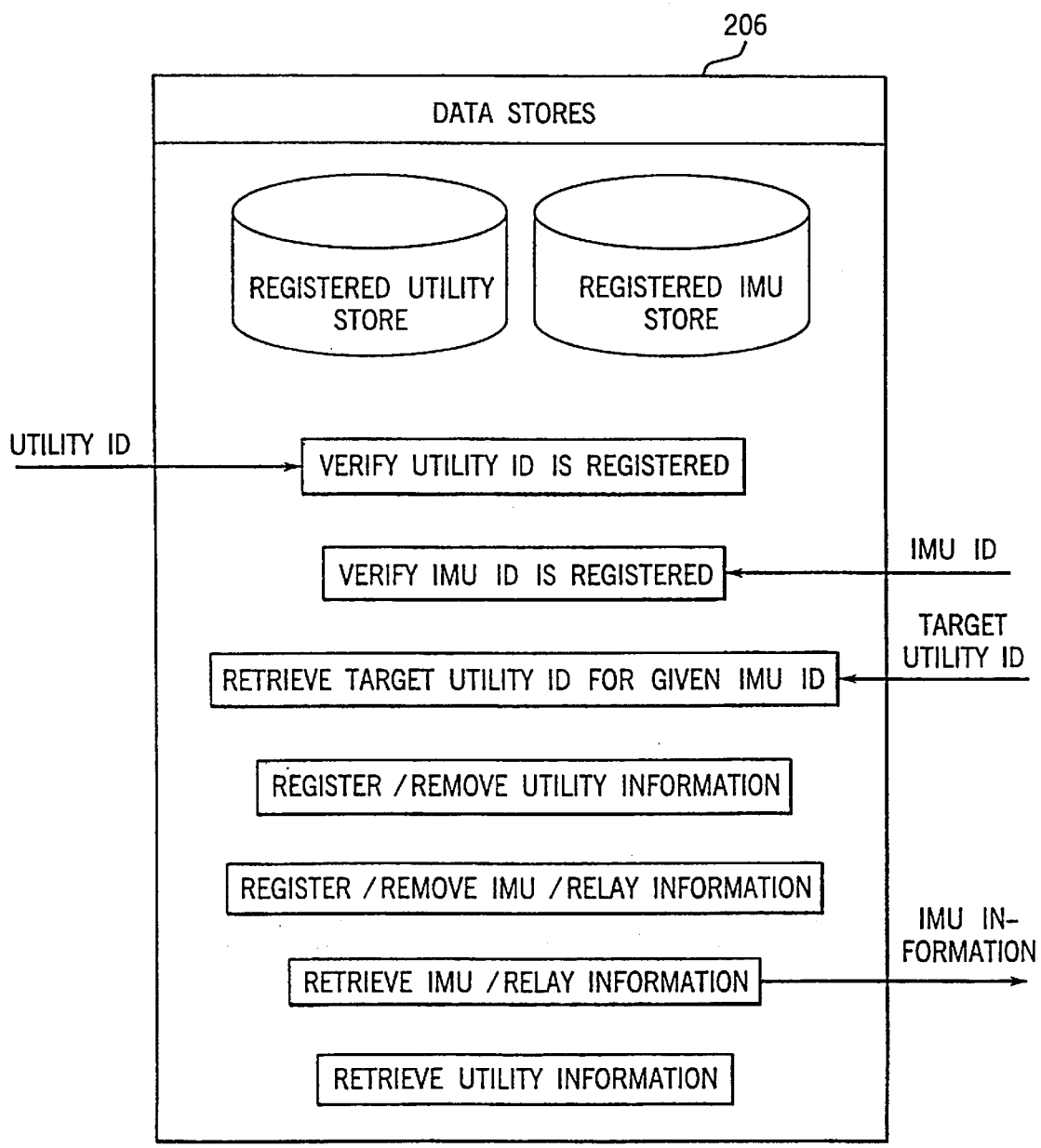
FIG. 15E is a flow diagram of the data stores portion of the data communication system of FIG. 14.

FIGS. 15E represents data or information stored in the gateway node's memory dealing with registered utility information and registered interface management unit information. This data includes the utility identification numbers of registered utilities, interface management unit identification numbers of registered interface management units, and other information for specific utilities and specific interface management units, so that the gateway node may communicate directly with the desired utility or correct interface management unit.

It is recognized that other equivalents, alternatives, and modifications aside from those expressly stated, are possible and within the scope of the appended claims.

What is claimed is:

1. An automatic meter reading data communication system for obtaining commodity utilization data from a commodity meter, said automatic meter reading data communication system comprising:

an interface management unit removably attachable to the exterior of the commodity meter, the interface management unit including a sealed housing enclosing a digital encoder having an input positionable to obtain commodity utilization data from the commodity meter through the sealed housing, the interface management unit including software programmable to interpret the commodity utilization data based upon the type of commodity meter to which the interface management unit is attached;

a gateway node located remotely from interface management unit and communicating with the interface management unit over a two-way wireless local area network; and wherein said gateway node communicates with a utility service provider over a two-way fixed common carrier wide area network.

2. The data communication system according to claim 1 wherein the interface management unit includes a digital encoder having an input connectable to the meter for obtaining commodity utilization data therefrom and for storing said data, and a two-way wireless transceiver coupled to said digital encoder for transmitting community utilization data from the meter and for receiving data requests from the gateway node.

3. The data communication system according to claim 1 wherein the gateway node includes an RF handler for transmitting interrogation signals to the interface management unit and for receiving commodity utilization data from the interface management unit, a wide area network handler for receiving data requests from the utility and for transmitting commodity utilization data to the utility, a message dispatcher for routing and processing interrogation signals and commodity utilization data, a data stores memory for storing utility information and interface management unit information, and a scheduler for storing a preprogrammed list of scheduled meter readings.

4. The data communication system according to claim 1 wherein the two-way wireless local area network utilizes a radio frequency spread spectrum communication technique.

5. The data communication system according to claim 4 wherein the wide area network handler utilizes commercially available fixed common carrier wide area network systems.

6. The data communication system according to claim 1 wherein said gateway node is capable of initiating communication in said data communication system responsive to a utility request message from said utility service provider.

7. The data communication system according to claim 3 wherein said gateway node is capable of initiating communication in said data communication system responsive to a preprogrammed scheduled reading message from said scheduler.

8. The data communication system according to claim 1 wherein said interface management unit is capable of initiating communication in said data communication system responsive to an alarm or tamper condition.

9. The data communication system according to claim 1 further comprising a relay node interposed between the interface management unit and the gateway node for retransmitting data and requests to and from the interface management unit.

10. The data communication system according to claim 1 wherein the gateway node stores utility identification information, interface management unit identification and scheduled meter readings in memory.

11. An interface management unit removably attachable to one of a plurality of different types of commodity meters, said interface management unit communicating with a remote gateway node, said interface management unit comprising:

a sealed housing positionable on the commodity meter and enclosing a digital encoder having an input positioned for obtaining commodity utilization data from the commodity meter through the housing and for storing said data;

an adapter ring attachable to the commodity meter and configured to removably receive the housing of the interface management unit such that the input for the digital encoder is positioned to obtain the commodity utilization data, wherein the adapter ring is configured based upon the type of commodity meter; and a two-way wireless transceiver coupled to said digital encoder for transmitting commodity utilization data from the meter and for receiving data requests from the gateway node over a two-way wireless local are network.

12. The interface management unit according to claim 11 wherein the digital encoder includes a supervisory microcontroller, a communication microcontroller connected to said supervisory microcontroller, said communication microcontroller controlling the internal and external communication functions of said interface management unit; and wherein said two-way wireless transceiver includes a spread spectrum processor coupled to said communications microcontroller for enabling said interface management unit to transmit and receive data utilizing a spread spectrum communication technique, and an RF transceiver coupled to said spread spectrum processor and said communication microcontroller for transmitting commodity utilization data from the meter and for receiving interrogation signals from the gateway node.

13. The interface management unit according to claim 11 wherein said interface management unit is programmable to interpret the commodity utilization data based upon the type of commodity meter to which the interface management unit is attached and for accommodating a plurality of different data reporting needs.

14. An interface management unit suitable for use with a plurality of types of commodity meters, said interface management unit communicating with a remote gateway node, said interface management unit comprising:

a sealed housing removably attachable to the exterior of the commodity meter;

a supervisory microcontroller contained within the housing and having an input coupled to the meter through the housing for obtaining commodity utilization data therefrom, the supervisory microcontroller being programmed to interpret and store the commodity utilization data based upon the type of commodity meter, said supervisory microcontroller periodically energizing the remaining portions of said interface management unit to sense for the presence of an interrogation signal;

a communication microcontroller connected to said supervisory microcontroller, said communication microcontroller controlling the internal and external communication functions of said interface management unit; a spread spectrum processor coupled to said communications microcontroller for enabling said interface management unit to transmit and receive data utilizing a spread spectrum communication technique; and an RF transceiver coupled to said spread spectrum processor and said communication microcontroller for transmitting commodity utilization data from the interface management unit and for receiving interrogation signals from the gateway node.

15. A method for automatically reading data from one of a plurality of types of commodity meters and transmitting that data over a two-way wireless communication line, the method comprising the steps of:

selecting an adapter ring based upon the type of commodity meter;

installing the adapter ring to the exterior of the commodity meter;

removably attaching an interface management unit on the adapter ring installed on the commodity meter, adapter ring positioning the interface management unit such that the interface management unit can read the commodity utilization data;

interrogating the interface management unit with a gateway node located remotely from the interface management unit over a two-way wireless RF spread spectrum local area network;

responding to the interrogation signal by providing an RF message over the local area network to the gateway note; and transmitting the requested data from the gateway node to a utility service provider over a fixed two-way common carrier wide area network.

16. The method according to claim 15 further comprising the step of interposing a relay node between said interface management unit and said gateway node for transmitting signals between said interface management unit and said gateway node.

17. The method according to claim 15 further comprising the step of programming the internal management unit to interpret the commodity utilization data read from the commodity meter based upon the type of commodity meter to which the interface management unit is attached.

18. The interface management unit according to claim 11 wherein the adapter ring receives the sealed housing to correctly position the input for the digital encoder relative to the commodity meter such that the digital encoder can obtain the commodity utilization data through the sealed housing.

* * * * *

UNITED STATES PATENT AND TRADEMARK OFFICE
CERTIFICATE OF CORRECTION

PATENT NO. : 6,246,677 B1  
DATED : June 12, 2001  
INVENTOR(S) : Kimbel A. Nap et al.

Page 1 of 1

It is certified that error appears in the above-identified patent and that said Letters Patent is hereby corrected as shown below:

Column 20, claim 2,
Line 4, delete "community" and substitute therefor -- commodity --.

Signed and Sealed this

Twenty-ninth Day of January, 2002

Attest:

JAMES E. ROGAN
Attesting Officer
Director of the United States Patent and Trademark Office